(12) United States Patent
Ishizeki et al.

(10) Patent No.: US 11,104,205 B2
(45) Date of Patent: Aug. 31, 2021

(54) VEHICLE AIR-CONDITIONING DEVICE

(71) Applicant: SANDEN AUTOMOTIVE CLIMATE SYSTEMS CORPORATION, Isesaki (JP)

(72) Inventors: Tetsuya Ishizeki, Isesaki (JP); Ryo Miyakoshi, Isesaki (JP); Kohei Yamashita, Isesaki (JP)

(73) Assignee: Sanden Automotive Climate Systems Corporation, Isesaki (JP)

( * ) Notice: Subject to any disclaimer, the term of this patent is extended or adjusted under 35 U.S.C. 154(b) by 0 days.

(21) Appl. No.: 16/634,710

(22) PCT Filed: Jul. 12, 2018

(86) PCT No.: PCT/JP2018/027199
§ 371 (c)(1),
(2) Date: Jan. 28, 2020

(87) PCT Pub. No.: WO2019/039153
PCT Pub. Date: Feb. 28, 2019

(65) Prior Publication Data
US 2020/0207182 A1  Jul. 2, 2020

(30) Foreign Application Priority Data
Aug. 24, 2017 (JP) ............................. JP2017-161056

(51) Int. Cl.
*F25B 29/00* (2006.01)
*B60H 1/14* (2006.01)
*B60H 1/00* (2006.01)

(52) U.S. Cl.
CPC ......... *B60H 1/143* (2013.01); *B60H 1/00921* (2013.01); *B60H 2001/00928* (2013.01)

(58) Field of Classification Search
CPC ............... B60H 1/143; B60H 1/00921; B60H 2001/00928
(Continued)

(56) References Cited

U.S. PATENT DOCUMENTS

2012/0205088 A1  8/2012  Morisita et al.
2012/0241139 A1*  9/2012  Katoh ..................... F25B 41/20
165/202
(Continued)

FOREIGN PATENT DOCUMENTS

JP  2014-213765 A  11/2014
JP  2016-090201 A  5/2016
(Continued)

OTHER PUBLICATIONS

Japan Patent Office, International Search Report issued in International Application No. PCT/JP2018/027199, dated Oct. 16, 2018.

*Primary Examiner* — Davis D Hwu
(74) *Attorney, Agent, or Firm* — Baker Botts L.L.P.

(57) ABSTRACT

A vehicle air-conditioning device is provided which is capable of eliminating inconvenience due to a reduction in heating capability when changing from heat absorption from outdoor air to heat absorption from a heat medium. A heat-generating equipment temperature adjusting device 61 has a heat medium heating heater 66 and a refrigerant-heat medium heat exchanger 64. The vehicle air-conditioning device has first and second heat medium heat absorption/heating modes to let a refrigerant discharged from a compressor 2 radiate heat in a radiator 4, decompress the refrigerant from which the heat has been radiated, and then let the refrigerant absorb heat in the refrigerant-heat medium heat exchanger. When the temperature of the heat medium is a predetermined threshold T1 or less upon changing from a heating operation to the first and second heat medium heat
(Continued)

absorption/heating modes, the heat medium is heated by the heat medium heating heater before the changing.

11 Claims, 13 Drawing Sheets

(58) Field of Classification Search
USPC .......................................................... 62/159
See application file for complete search history.

(56) References Cited

U.S. PATENT DOCUMENTS

| | | | |
|---|---|---|---|
| 2012/0255319 A1* | 10/2012 | Itoh | B60H 1/00921 |
| | | | 62/160 |
| 2015/0151609 A1* | 6/2015 | Satou | F25B 5/02 |
| | | | 165/63 |
| 2016/0107505 A1 | 4/2016 | Johnston | |
| 2016/0185185 A1* | 6/2016 | Suzuki | B60L 1/02 |
| | | | 237/5 |

FOREIGN PATENT DOCUMENTS

| | | |
|---|---|---|
| JP | 2018-122653 A | 8/2018 |
| JP | 2018-140720 A | 9/2018 |
| WO | 2011/086683 A1 | 7/2011 |

* cited by examiner

VEHICLE AIR-CONDITIONING DEVICE

CROSS-REFERENCE TO RELATED APPLICATIONS

This application is a U.S. National Stage Patent Application under 35 U.S.C. § 371 of International Patent Application No. PCT/JP2018/027199, filed on Jul. 12, 2018, which claims the benefit of Japanese Patent Application No. 2017-161056, filed on Aug. 24, 2017, the disclosures of each of which are incorporated herein by reference in their entirety.

TECHNICAL FIELD

The present invention relates to an air conditioner of a heat pump system which conditions air of a vehicle interior of a vehicle, and more particularly, it relates to a vehicle air-conditioning device which is suitable for a hybrid car and an electric vehicle each having heat generating equipment such as a battery.

BACKGROUND ART

Due to actualization of environmental problems in recent years, hybrid cars and electric vehicles each of which drives an electric motor for running by power supplied from a battery have spread. Further, as an air conditioning device which is applicable to such a vehicle, there has been developed an air conditioning device which includes a refrigerant circuit to which a compressor to compress and discharge a refrigerant, a radiator disposed on a vehicle interior side to let the refrigerant radiate heat, a heat absorber disposed on the vehicle interior side to let the refrigerant absorb heat, and an outdoor heat exchanger disposed outside the vehicle interior to let outdoor air flow and let the refrigerant absorb or radiate heat are connected, and which changes and executes a heating mode (a heating operation) to let the refrigerant discharged from the compressor radiate heat in the radiator and let the refrigerant from which the heat has been radiated in the radiator absorb heat in the outdoor heat exchanger, and a cooling mode (a cooling operation) to let the refrigerant discharged from the compressor radiate heat in the outdoor heat exchanger and let the refrigerant absorb heat in the heat absorber (refer to, for example, Patent Document 1).

On the other hand, for example, the battery (heat generating equipment) mounted in the vehicle becomes high in temperature during its charging, or due to self-heat generation during its discharging. There is a risk that when the charging/discharging of the battery is performed in such a state, its deterioration progresses and soon the battery causes an operation failure to lead to breakage. Thus, there has also been developed a battery capable of adjusting the temperature of a secondary battery (battery) by circulating through the battery, air (heat medium) cooled by a refrigerant circulated in a refrigerant circuit (refer to, for example, Patent Document 2).

CITATION LIST

Patent Documents

Patent Document 1: Japanese Patent Application Publication No. 2014-213765
Patent Document 2: Japanese Patent Application Publication No. 2016-90201

SUMMARY OF THE INVENTION

Problems to be Solved by the Invention

Here, if it is made possible to utilize the heat of the heat generating equipment such as the battery for heating of the vehicle interior by enabling the refrigerant to absorb heat from the heat medium, the progress of frosting to the outdoor heat exchanger can be delayed. Further, even when frost is formed in the outdoor heat exchanger to make it unable to perform heat absorption from the outdoor air, it is possible to heat the vehicle interior by the heat absorption from the heat medium.

However, a problem arises in that when the temperature of the heat medium is cold when changing from an operation state of performing heat absorption from the outdoor air in the outdoor heat exchanger to an operation state of performing heat absorption from the heat medium, a heating capability is significantly reduced, and the temperature of the air blown out to the vehicle interior is temporarily lowered, thereby giving discomfort and uncomfortable feeling to a passenger.

The present invention has been developed to solve such conventional technical problems, and an object thereof is to provide a vehicle air-conditioning device capable of eliminating inconvenience due to a reduction in heating capability when changing from heat absorption from outdoor air to heat absorption from a heat medium.

Means for Solving the Problems

A vehicle air-conditioning device of the present invention is provided which includes a compressor to compress a refrigerant, an air flow passage through which air to be supplied to a vehicle interior flows, a radiator to let the refrigerant radiate heat, thereby heating the air to be supplied from the air flow passage to the vehicle interior, an outdoor heat exchanger disposed outside the vehicle interior to let the refrigerant absorb heat, and a control device, and in which the control device executes at least a heating operation to let the refrigerant discharged from the compressor radiate heat in the radiator, decompress the refrigerant from which the heat has been radiated, and then let the refrigerant absorb heat in the outdoor heat exchanger. The vehicle air-conditioning device is characterized by including a heat-generating equipment temperature adjusting device to circulate a heat medium in heat generating equipment mounted in a vehicle to adjust the temperature of the heat generating equipment, and in that the heat-generating equipment temperature adjusting device has a heating device to heat the heat medium, and a refrigerant-heat medium heat exchanger to exchange heat between the refrigerant and the heat medium, and that the control device has a heat medium heat absorption/heating mode to let the refrigerant discharged from the compressor radiate heat in the radiator, decompress the refrigerant from which the heat has been radiated, and then let the refrigerant absorb heat in the refrigerant-heat medium heat exchanger, and when the temperature of the heat medium is a predetermined threshold T1 or less upon changing from the heating operation to the heat medium heat absorption/heating mode, the control device heats the heat medium by the heating device to raise the temperature of the heat medium before changing to the heat medium heat absorption/heating mode, and then performs changing to the heat medium heat absorption/heating mode.

The vehicle air-conditioning device of the invention of claim 2 is characterized in that in the above invention, when a predetermined outdoor air heat-unabsorbable prediction and judgment condition is established in the heating operation, the control device determines that there is a possibility that it will not be able to absorb heat from outdoor air in the outdoor heat exchanger and judges whether the temperature of the heat medium is the threshold T1 or less, and when the temperature thereof is the threshold T1 or less, the control device starts heating of the heat medium by the heating device and makes a transition to the heat medium heat absorption/heating mode in wait for raising of the temperature of the heat medium to at least a temperature higher than the threshold T1.

The vehicle air-conditioning device of the invention of claim 3 is characterized in that in the above invention, the outdoor air heat-unabsorbable prediction and judgment condition includes at least one of reducing a suction refrigerant temperature Ts of the compressor to a predetermined value Ts' or less, increasing an amount of frosting to the outdoor heat exchanger to a predetermined value Fr1 or higher, raising a progress speed of frosting to the outdoor heat exchanger to a predetermined value X1 or higher, reducing an outdoor air temperature Tam to a predetermined value Tam1 or less, and raising a reducing speed of the outdoor air temperature Tam to a predetermined value Y1 or higher.

The vehicle air-conditioning device of the invention of claim 4 is characterized in that in each invention described above, the control device determines the threshold T1 on the basis of at least one of a target heating capability TGQhp of the radiator, a target outlet temperature TAO being a target value of a temperature of the air blown out to the vehicle interior, a voltage BLV of an indoor blower by which the air is to be passed through the air flow passage, and a target heater temperature TCO being a target value of a temperature of the air on a leeward side of the radiator.

The vehicle air-conditioning device of the invention of claim 5 is characterized in that in each invention described above, when a predetermined outdoor air heat-absorbable judgment condition is established upon executing the heat medium heat absorption/heating mode, the control device determines that the absorption of heat from the outdoor air is possible in the outdoor heat exchanger, and lets the refrigerant from which the heat has been radiated in the radiator absorb heat in the outdoor heat exchanger and the refrigerant-heat medium heat exchanger.

The vehicle air-conditioning device of the invention of claim 6 is characterized in that in the above invention, the outdoor air heat-absorbable judgment condition includes at least one of the suction refrigerant temperature Ts of the compressor being a predetermined value Ts2 or higher lower than the predetermined value Ts1, the amount of frosting to the outdoor heat exchanger being a predetermined value Fr2 or less larger than the predetermined value Fr1, the progress speed of frosting to the outdoor heat exchanger being a predetermined value X2 or less earlier than the predetermined value X1, the outdoor air temperature Tam being a predetermined value Tam2 or higher lower than the predetermined value Tam1, and the reducing speed of the outdoor air temperature Tam being a predetermined value Y2 or less earlier than the predetermined value Y1.

Advantageous Effect of the Invention

According to the present invention, in a vehicle air-conditioning device which includes a compressor to compress a refrigerant, an air flow passage through which air to be supplied to a vehicle interior flows, a radiator to let the refrigerant radiate heat, thereby heating the air to be supplied from the air flow passage to the vehicle interior, an outdoor heat exchanger disposed outside the vehicle interior to let the refrigerant absorb heat, and a control device, whereby the control device executes at least a heating operation to let the refrigerant discharged from the compressor radiate heat in the radiator, decompress the refrigerant from which the heat has been radiated, and then let the refrigerant absorb heat in the outdoor heat exchanger, the vehicle air-conditioning device includes a heat-generating equipment temperature adjusting device to circulate a heat medium in heat generating equipment mounted in a vehicle to adjust the temperature of the heat generating equipment. The heat-generating equipment temperature adjusting device has a heating device to heat the heat medium, and a refrigerant-heat medium heat exchanger to exchange heat between the refrigerant and the heat medium. The control device has a heat medium heat absorption/heating mode to let the refrigerant discharged from the compressor radiate heat in the radiator, decompress the refrigerant from which the heat has been radiated, and then let the refrigerant absorb heat in the refrigerant-heat medium heat exchanger. Therefore, if changing to the heat medium heat absorption/heating mode is made, the heat absorption is made from the heat medium of the heat-generating equipment temperature adjusting device to perform heating of the vehicle interior efficiently. For example, even when the cooling of the heating device is appropriately done while suppressing frosting to the outdoor heat exchanger, or frost is formed in the outdoor heat exchanger to make it unable to perform heat absorption from the outdoor air, the heat absorption is performed from the heat medium of the heat-generating equipment temperature adjusting device to thereby make it possible to heat the vehicle interior.

Particularly when the temperature of the heat medium is a predetermined threshold T1 or less upon changing from the heating operation to the heat medium heat absorption/heating mode, the control device heats the heat medium by the heating device before changing to the heat medium heat absorption/heating mode to raise the temperature of the heat medium and then performs changing to the heat medium heat absorption/heating mode. Thus, it is possible to sufficiently ensure a heating capability when changing from the heating operation to the heat medium heat absorbance/heating mode. Consequently, it is also possible to eliminate the disadvantage that the heating operation is changed to the heat medium heat absorption/heating mode in the state in which the temperature of the heat medium is low, and the outlet temperature is temporarily lowered, so that a passenger feels discomfort and an uncomfortable feeling.

Further, as in the invention of claim 2, when a predetermined outdoor air heat-unabsorbable prediction and judgment condition is established in the heating operation, the control device determines that there is a possibility that it will not be able to absorb heat from the outdoor air in the outdoor heat exchanger, and judges whether the temperature of the heat medium is the threshold T1 or less. If the temperature thereof is the threshold T1 or less, the control device starts to heat the heat medium by the heating device and makes a transition to the heat medium heat absorption/heating mode in wait for raising of the temperature of the heat medium to at least a temperature higher than the threshold T1, thus making it possible to smoothly perform changing from the heating operation to the heat medium heat absorption/heating mode.

Incidentally, the outdoor air heat-unabsorbable prediction and judgment condition in this case preferably includes as in the invention of claim 3, at least one of reducing a suction refrigerant temperature Ts of the compressor to a predetermined value Ts' or less, increasing an amount of frosting to the outdoor heat exchanger to a predetermined value Fr1 or higher, raising a progress speed of frosting to the outdoor heat exchanger to a predetermined value X1 or higher, reducing an outdoor air temperature Tam to a predetermined value Tam1 or less, and raising a reducing speed of the outdoor air temperature Tam to a predetermined value Y1 or higher.

Further, as in the invention of claim 4, the control device determines the threshold T1 on the basis of at least one of a target heating capability TGQhp of the radiator, a target outlet temperature TAO being a target value of a temperature of the air blown out to the vehicle interior, a voltage BLV of the indoor blower by which the air is to be passed through the air flow passage, and a target heater temperature TCO being a target value of a temperature of the air on a leeward side of the radiator. Consequently, the control device is capable of suitably determining whether it is necessary to heat the heat medium by the heating device, and avoiding unnecessary heating by the heating device.

Furthermore, as in the invention of claim 5, when a predetermined outdoor air heat-absorbable judgment condition is established upon executing the heat medium heat absorption/heating mode, the control device determines that the absorption of heat from the outdoor air is possible in the outdoor heat exchanger, and lets the refrigerant from which the heat has been radiated in the radiator absorb heat in the outdoor heat exchanger and the refrigerant-heat medium heat exchanger. Consequently, when the absorption of heat from the outdoor air is possible in the outdoor heat exchanger, it is possible to perform heat absorption even from the outdoor air together with the absorption of heat from the heat medium and thereby heat the vehicle interior.

Incidentally, as in the invention of claim 6, the outdoor air heat-absorbable judgment condition in this case is preferably at least one of the suction refrigerant temperature Ts of the compressor being a predetermined value Ts2 or higher lower than the predetermined value Ts1, the amount of frosting to the outdoor heat exchanger being a predetermined value Fr2 or less larger than the predetermined value Fr1, the progress speed of frosting to the outdoor heat exchanger being a predetermined value X2 or less earlier than the predetermined value X1, the outdoor air temperature Tam being a predetermined value Tam2 or higher lower than the predetermined value Tam1, and the reducing speed of the outdoor air temperature Tam being a predetermined value Y2 or less earlier than the predetermined value Y1.

MODE FOR CARRYING OUT THE INVENTION

Hereinafter, description will be made as to embodiments of the present invention in detail with reference to the drawings.

Figure 1:
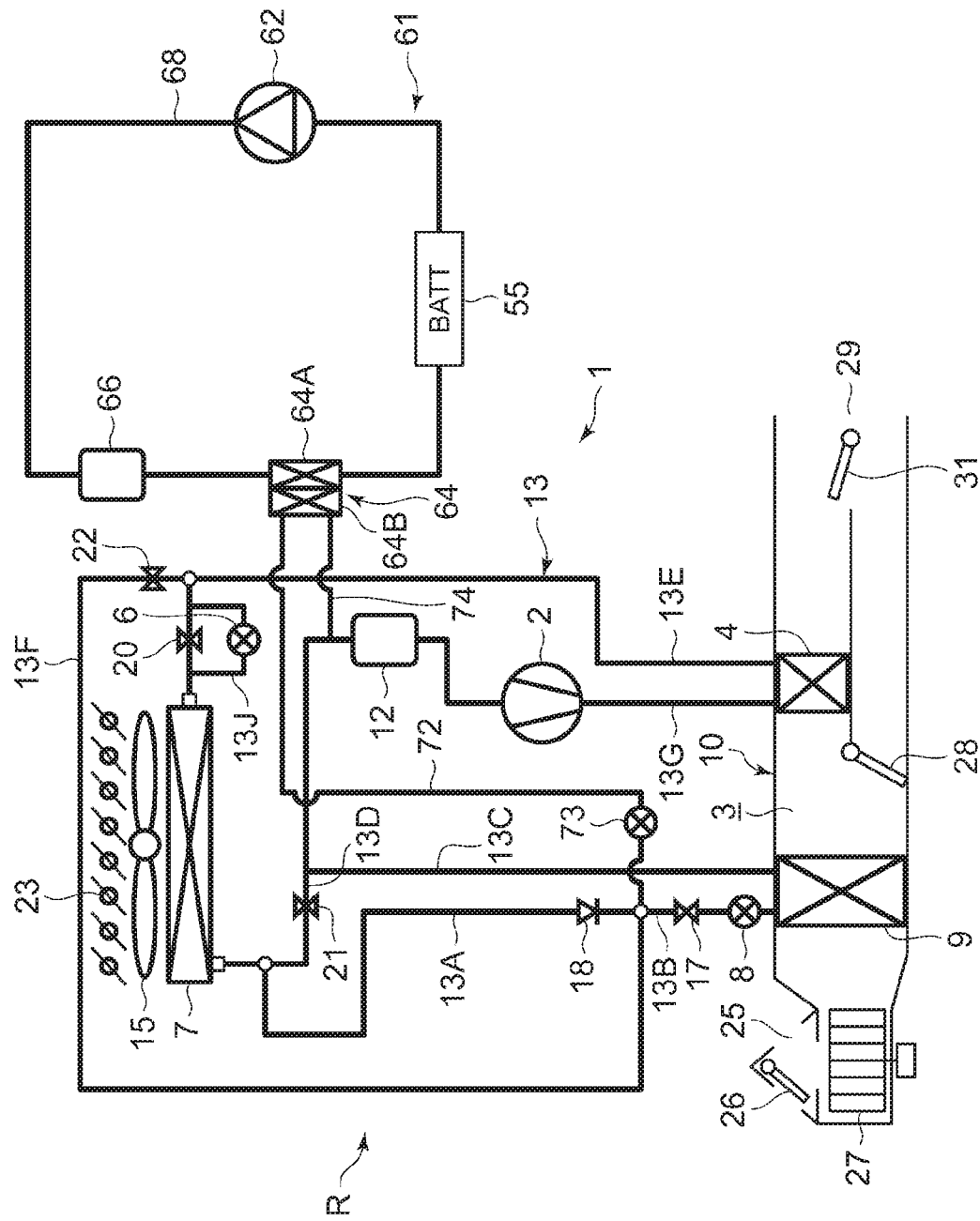
FIG. 1 is a constitutional view of a vehicle air-conditioning device of an embodiment to which the present invention is applied.

FIG. 1 illustrates a constitutional view of a vehicle air-conditioning device 1 of an embodiment of the present invention. A vehicle of the embodiment to which the present invention is applied is an electric vehicle (EV) in which an engine (an internal combustion engine) is not mounted, and is mounted with a battery 55 and runs with an electric motor for running (not shown in the drawing) which is driven by being supplied with power charged in the battery 55. The vehicle air-conditioning device 1 of the present invention is also driven by the power of the battery 55.

That is, in the electric vehicle which is not capable of performing heating by engine waste heat, the vehicle air-conditioning device 1 of the embodiment performs a heating operation by a heat pump operation in which a refrigerant circuit R is used. Further, the vehicle air-conditioning device 1 selectively executes respective air conditioning operations of a dehumidifying and heating operation, an internal cycle operation, a dehumidifying and cooling operation, and a cooling operation to perform air conditioning of a vehicle interior.

Incidentally, the vehicle is not limited to the electric vehicle, and the present invention is also effective for a so-called hybrid car in which the engine is used together with the electric motor for running. Further, it is needless to say that the present invention is also applicable to a usual car which runs with the engine.

The vehicle air-conditioning device 1 of the embodiment performs air conditioning (heating, cooling, dehumidifying, and ventilation) of the vehicle interior of the electric vehicle. An electric type of compressor 2 to compress a refrigerant, a radiator 4 which is provided in an air flow passage 3 of an HVAC unit 10 in which air in the vehicle interior is ventilated and circulated, to let the high-temperature high-pressure refrigerant discharged from the compressor 2 flow therein via a refrigerant pipe 13G and to let the refrigerant radiate heat to the vehicle interior, an outdoor expansion valve 6 constituted of an electric valve which decompresses and expands the refrigerant during the heating, an outdoor heat exchanger 7 which performs heat exchange between the refrigerant and outdoor air to function as a radiator to let the refrigerant radiate heat during the cooling and to function as an evaporator to let the refrigerant absorb heat during the heating, an indoor expansion valve 8 constituted of an electric valve (which may be a mechanical expansion valve) to decompress and expand the refrigerant, a heat absorber 9 provided in the air flow passage 3 to let the refrigerant absorb heat during the cooling and dehumidifying from interior and exterior of the vehicle, an accumulator 12, and others are successively connected by a refrigerant pipe 13, whereby a refrigerant circuit R is constituted. The outdoor expansion valve 6 decompresses and expands the refrigerant flowing out from the radiator 4 and flowing in the outdoor heat exchanger 7 and can also be fully closed.

Incidentally, an outdoor blower 15 is provided in the outdoor heat exchanger 7. The outdoor blower 15 forcibly passes the outdoor air through the outdoor heat exchanger 7 to thereby perform the heat exchange between the outdoor air and the refrigerant, whereby the outdoor air is made to pass through the outdoor heat exchanger 7 even during stopping of the vehicle (i.e., its velocity is 0 km/h). Further, 23 in the drawing is a shutter referred to as a grille shutter. When the shutter 23 is closed, it is constituted to prevent running air from flowing into the outdoor heat exchanger 7.

Further, a refrigerant pipe 13A connected to a refrigerant outlet side of the outdoor heat exchanger 7 is connected to a refrigerant pipe 13B via a check valve 18. Incidentally, the check valve 18 has a refrigerant pipe 13B side which serves as a forward direction. The refrigerant pipe 13B is connected to the indoor expansion valve 8 via a solenoid valve 17 as an opening/closing valve to be opened during the cooling. In the embodiment, these solenoid valve 17 and indoor expansion valve 8 constitute a valve device to control the inflow of the refrigerant into the heat absorber 9.

In addition, the refrigerant pipe 13A extending out from the outdoor heat exchanger 7 branches, and this branching refrigerant pipe 13D communicates and connects with a refrigerant pipe 13C located on an outlet side of the heat absorber 9 via a solenoid valve 21 to be opened during the heating. Then, the refrigerant pipe 13C after the refrigerant pipe 13D has joined thereto is connected to the accumulator 12 via a check valve 40, and the accumulator 12 is connected to a refrigerant suction side of the compressor 2. Incidentally, the check valve 40 has an accumulator 12 side which serves as a forward direction.

Furthermore, a refrigerant pipe 13E on an outlet side of the radiator 4 branches to a refrigerant pipe 13J and a refrigerant pipe 13F before the outdoor expansion valve 6 (on a refrigerant upstream side). One branching refrigerant pipe 13J is connected to a refrigerant inlet side of the outdoor heat exchanger 7 via the outdoor expansion valve 6. Additionally, the other branching refrigerant pipe 13F communicates and connects with a connecting part of the refrigerant pipe 13A and the refrigerant pipe 13B located on a refrigerant downstream side of the check valve 18 and a refrigerant upstream side of the solenoid valve 17 via a solenoid valve 22 to be opened during the dehumidifying.

Consequently, the refrigerant pipe 13F is connected in parallel with a series circuit of the outdoor expansion valve 6, the outdoor heat exchanger 7, and the check valve 18. The refrigerant pipe 13F serves as a circuit which bypasses the outdoor expansion valve 6, the outdoor heat exchanger 7, and the check valve 18. Further, a solenoid valve 20 is connected in parallel with the outdoor expansion valve 6.

Additionally, in the air flow passage 3 on an air upstream side of the heat absorber 9, respective suction ports such as an outdoor air suction port and an indoor air suction port are formed (represented by a suction port 25 in FIG. 1), and in the suction port 25, a suction changing damper 26 is disposed to change the air to be introduced into the air flow passage 3 to indoor air which is air of the vehicle interior (indoor air circulation) and outdoor air which is air outside the vehicle interior (outdoor air introduction). Furthermore, an indoor blower (a blower fan) 27 to supply the introduced indoor or outdoor air to the air flow passage 3 is disposed on an air downstream side of the suction changing damper 26.

Additionally, in the air flow passage 3 on an air upstream side of the radiator 4, there is provided an air mix damper 28 to adjust a ratio at which the air in the air flow passage 3 (the indoor or outdoor air) flowing into the air flow passage 3 and passed through the heat absorber 9 is to be passed through the radiator 4. Furthermore, in the air flow passage 3 on an air downstream side of the radiator 4, there is formed each outlet (represented by an outlet 29 in FIG. 1) of FOOT (foot), VENT (vent) or DEF (defroster), and in the outlet 29, an outlet changing damper 31 is disposed to execute changing control of blowing of the air from each outlet mentioned above.

Furthermore, the vehicle air-conditioning device 1 of the present invention is provided with a heat-generating equipment temperature adjusting device 61 for circulating a heat medium through the battery 55 to adjust the temperature of the battery 55. Incidentally, in the embodiment, the battery 55 has been adopted as an example of the heat generating equipment in the present invention, but is not limited thereto. The battery 55 may be an electric motor for running, an inverter to control it, or the like.

The heat-generating equipment temperature adjusting device 61 of this embodiment is provided with a circulating pump 62 as a circulating device for circulating the heat medium through the battery 55 (heat generating equipment), a heat medium heating heater 66 as a heating device, and a refrigerant-heat medium heat exchanger 64. Those and the battery 55 are annularly connected by a heat medium pipe 68. In the case of the present embodiment, the heat medium heating heater 66 is connected to a discharge side of the circulating pump 62. An inlet of a heat medium flow passage 64A of the refrigerant-heat medium heat exchanger 64 is connected to an outlet of the heat medium heating heater 66. An inlet of the battery 55 is connected to an outlet of the heat medium flow passage 64A, and an outlet of the battery 55 is connected to a suction side of the circulating pump 62.

As the heat medium used in the heat-generating equipment temperature adjusting device 61, for example, water, a refrigerant such as HFO-1234f, liquid such as a coolant or the like, or gas such as air or the like can be employed. Incidentally, in the embodiment, water is employed as the heat medium. Also, the heat medium heating heater 66 is constituted of an electric heater such as a PTC heater or the like. Further, for example, a jacket structure capable of circulating the heat medium in a heat exchange relation with the battery 55 is provided around the battery 55.

Then, when the circulating pump 62 is operated, the heat medium discharged from the circulating pump 62 reaches the heat medium heating heater 66. When the heat medium heating heater 66 generates heat, the heat medium is heated thereat and then next flows into the heat medium flow passage 64A of the refrigerant-heat medium heat exchanger 64. The heat medium flowing out from the heat medium flow passage 64A of the refrigerant-heat medium heat exchanger 64 reaches the battery 55. The heat medium performs heat exchange with the battery 55 thereat and is then sucked into the circulating pump 62 to be circulated in the heat medium pipe 68.

On the other hand, one end of a branch pipe 72 as a branch circuit disposed on a refrigerant downstream side (forward side) of the check valve 18 and a refrigerant upstream side of the solenoid valve 17 is connected to an outlet of the refrigerant pipe 13F of the refrigerant circuit R, i.e., a connecting part of the refrigerant pipe 13F, the refrigerant pipe 13A, and the refrigerant pipe 13B. An auxiliary expansion valve 73 constituted of an electric valve is provided in the branch pipe 72. The auxiliary expansion valve 73 is capable of decompressing and expanding the refrigerant flowing into a refrigerant flow passage 64B to be described later, of the refrigerant-heat medium heat exchanger 64 and also performing full closing. Then, the other end of the branch pipe 72 is connected to the refrigerant flow passage 64B of the refrigerant-heat medium heat exchanger 64. One end of a refrigerant pipe 74 is connected to an outlet of the refrigerant flow passage 64B, and the other end of the refrigerant pipe 74 is connected to the refrigerant pipe 13C before the accumulator 12 (a refrigerant upstream side of the accumulator 12 and a refrigerant downstream side of the check valve 40). Then, it is to be noted that these auxiliary expansion valve 73 and others also constitute a part of the refrigerant circuit R, and at the same time constitutes even a part of the heat-generating equipment temperature adjusting device 61. When the auxiliary expansion valve 73 is opened, the refrigerant (some refrigerant or all refrigerant) flowing out from the refrigerant pipe 13F and the outdoor heat exchanger 7 is decompressed in the auxiliary expansion valve 73 and then flows into the refrigerant flow passage 64B of the refrigerant-heat medium heat exchanger 64 to evaporate there. The refrigerant absorbs heat from the heat medium flowing through the heat medium flow passage 64A in the process of flowing through the refrigerant flow passage 64B, followed by being sucked into the compressor 2 through the accumulator 12.

Figure 2:
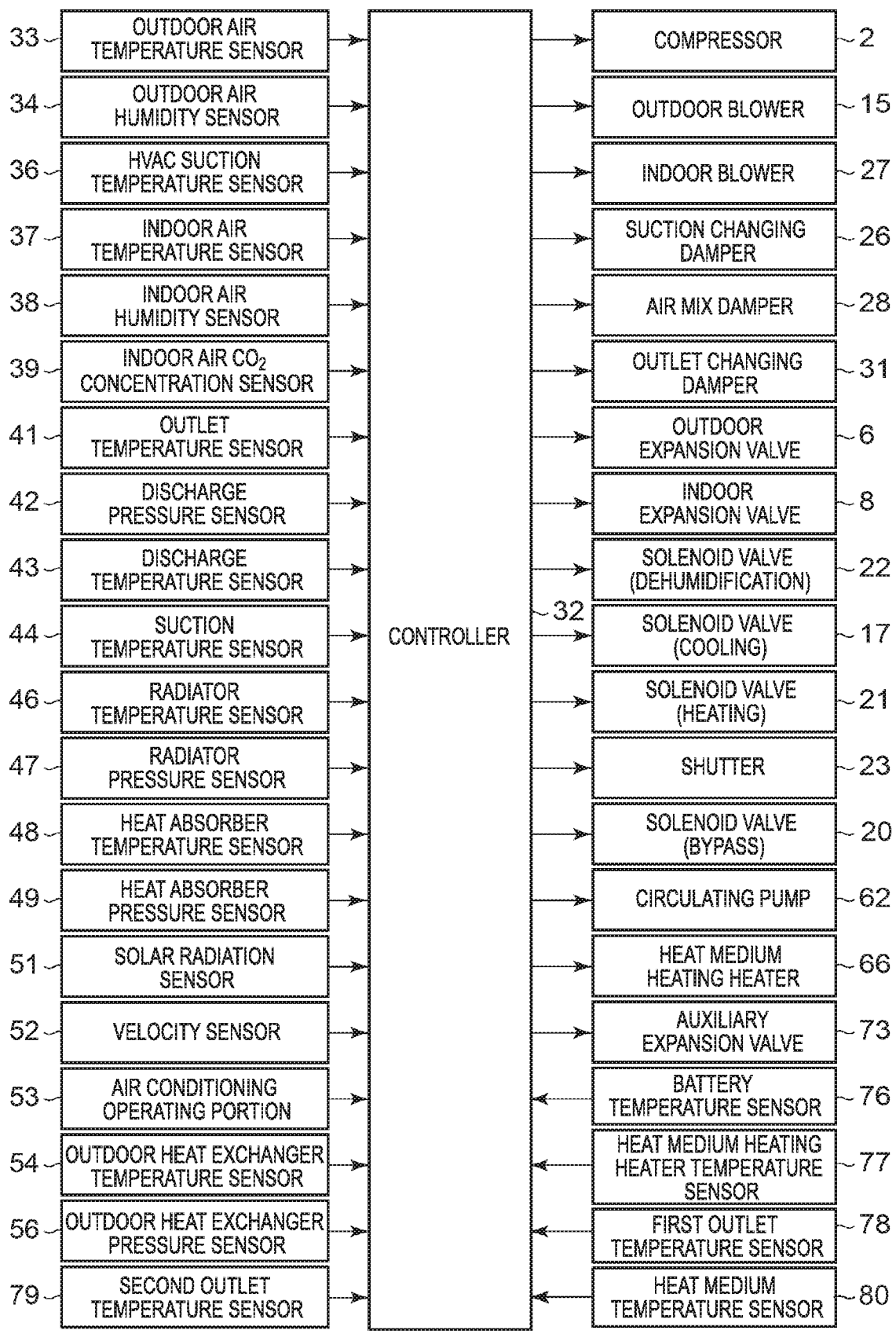
FIG. 2 is a block diagram of an electric circuit of a controller in the vehicle air-conditioning device of FIG. 1.

Next, in FIG. 2, 32 is a controller (ECU) as a control device. The controller 32 is constituted of a microcomputer that is an example of a computer including a processor, and an input of the controller is connected to respective outputs of an outdoor air temperature sensor 33 which detects an outdoor air temperature (Tam) of the vehicle, an outdoor air humidity sensor 34 which detects an outdoor air humidity, an HVAC suction temperature sensor 36 which detects a temperature of the air to be sucked from the suction port 25 to the air flow passage 3, an indoor air temperature sensor 37 which detects a temperature of the air of the vehicle interior (the indoor air), an indoor air humidity sensor 38 which detects a humidity of the air of the vehicle interior, an indoor air $CO_2$ concentration sensor 39 which detects a carbon dioxide concentration of the vehicle interior, an outlet temperature sensor 41 which detects a temperature of the air to be blown out from the outlet 29 to the vehicle interior, a discharge pressure sensor 42 which detects a pressure (a discharge pressure Pd) of the refrigerant discharged from the compressor 2, a discharge temperature sensor 43 which detects a temperature of the refrigerant discharged from the compressor 2, a suction temperature sensor 44 which detects a temperature Ts of the refrigerant to be sucked into the compressor 2, a radiator temperature sensor 46 which detects a temperature of the radiator 4 (the temperature of the refrigerant immediately after the refrigerant flows out from the radiator 4: a radiator temperature TCI in the embodiment), a radiator pressure sensor 47 which detects a refrigerant pressure of the radiator 4 (the pressure of the refrigerant in the radiator 4 or immediately after the refrigerant flows out from the radiator 4: a radiator pressure PCI), a heat absorber temperature sensor 48 which detects a temperature of the heat absorber 9 (the temperature of the air passed through the heat absorber 9 or the temperature of the heat absorber 9 itself: a heat absorber temperature Te), a heat absorber pressure sensor 49 which detects a refrigerant pressure of the heat absorber 9 (the pressure of the refrigerant in the heat absorber 9 or immediately after the refrigerant flows out from the heat absorber 9), a solar radiation sensor 51 of, e.g., a photo sensor system to detect a solar radiation amount into the vehicle interior, a velocity sensor 52 to detect a moving speed (a velocity) of the vehicle, an air conditioning (aircon) operating portion 53 to set the changing of a predetermined temperature or an air conditioning operation, an outdoor heat exchanger temperature sensor 54 which detects a temperature of the outdoor heat exchanger 7 (the temperature of the refrigerant immediately after the refrigerant flows out from the outdoor heat exchanger 7, or the temperature of the outdoor heat exchanger 7 itself: an outdoor heat exchanger temperature TXO. When the outdoor heat exchanger 7 functions as an evaporator, the outdoor heat exchanger temperature TXO becomes an evaporation temperature of the refrigerant in the outdoor heat exchanger 7), and an outdoor heat exchanger pressure sensor 56 which detects a refrigerant pressure of the outdoor heat exchanger (the pressure of the refrigerant in the outdoor heat exchanger 7 or immediately after the refrigerant flows out from the outdoor heat exchanger 7: an outdoor heat exchanger pressure PXO that becomes an evaporation pressure of the refrigerant in the outdoor heat exchanger 7).

Furthermore, the input of the controller 32 is further connected also to respective outputs of a battery temperature sensor 76 which detects a temperature of the battery 55 (a temperature of the battery 55 itself, or a temperature of the heat medium flowing out from the battery 55, or a temperature of the heat medium flowing into the battery 55), a heat medium heating heater temperature sensor 77 which detects a temperature of the heat medium heating heater 66 (a temperature of the heat medium heating heater 66 itself), a heat medium temperature sensor 80 which detects a temperature of the heat medium (a heat medium temperature Tw) flowing out from the heat medium heating heater 66, a first outlet temperature sensor 78 which detects a temperature of the heat medium flowing out from the heat medium flow passage 64A of the refrigerant-heat medium heat exchanger 64, and a second outlet temperature sensor 79 which detects a temperature of the refrigerant flowing out from the refrigerant flow passage 64B.

On the other hand, an output of the controller 32 is connected to the compressor 2, the outdoor blower 15, the indoor blower (the blower fan) 27, the suction changing damper 26, the air mix damper 28, the outlet changing damper 31, the outdoor expansion valve 6, the indoor expansion valve 8, the respective solenoid valves of the solenoid valve 22 (dehumidification), the solenoid valve 17 (cooling), the solenoid valve 21 (heating), and the solenoid valve 20 (bypass), the shutter 23, the circulating pump 62, the heat medium heating heater 66, and the auxiliary expansion valve 73. Then, the controller 32 controls these components on the basis of the outputs of the respective sensors and the setting input by the air conditioning operating portion 53.

Next, an operation of the vehicle air-conditioning device 1 of the embodiment, having the above constitution will be described. In the embodiment, the controller 32 changes and executes the respective air conditioning operations of the heating operation, the dehumidifying and heating operation, the internal cycle operation, the dehumidifying and cooling operation, and the cooling operation and adjusts the temperature of the battery 55 to within a predetermined appropriate temperature range. Description will initially be made as to each air conditioning operation of the refrigerant circuit R.

(1) Heating Operation

Figure 3:
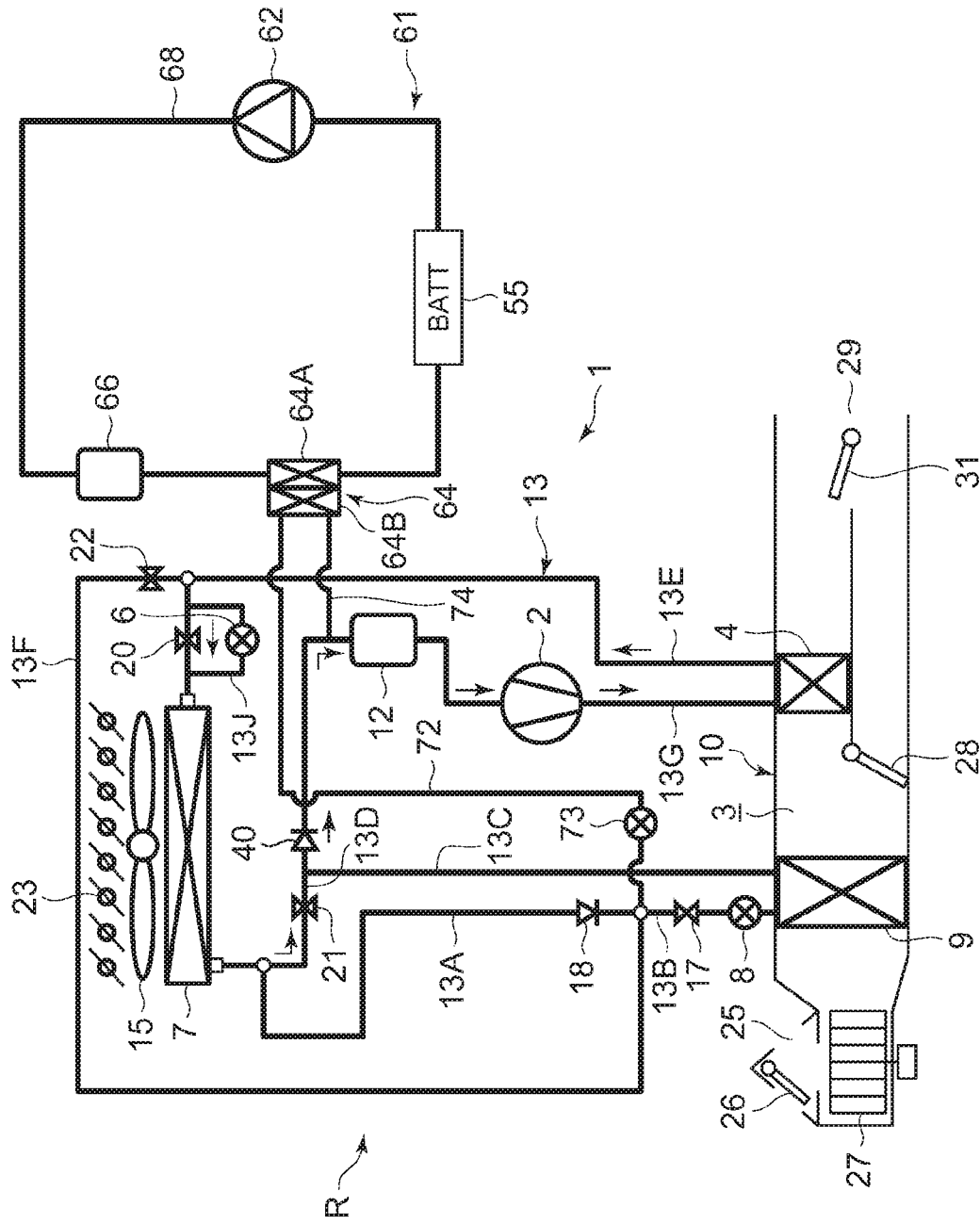
FIG. 3 is a diagram describing a heating operation by the controller of FIG. 2.

Description will first be made as to the heating operation with reference to FIG. 3. FIG. 3 shows the flow (solid line arrows) of the refrigerant of the refrigerant circuit R in the heating operation. When the heating operation is selected by the controller 32 (an automatic mode) or a manual operation to the air conditioning operating portion 53 (a manual mode), the controller 32 opens the solenoid valve 21 (for the heating) and closes the solenoid valve 17 (for the cooling). The controller also closes the solenoid valve 22 (for the dehumidification) and the solenoid valve 20 (for the bypass). Incidentally, the shutter 23 is opened.

Then, the controller operates the compressor 2 and the respective blowers 15 and 27, and the air mix damper 28 has a state of adjusting a ratio at which the air blown out from the indoor blower 27 is to be passed through the radiator 4. In consequence, a high-temperature high-pressure gas refrigerant discharged from the compressor 2 flows into the radiator 4. The air in the air flow passage 3 passes through the radiator 4, and hence the air in the air flow passage 3 is heated by the high-temperature refrigerant in the radiator 4. On the other hand, the refrigerant in the radiator 4 has the heat taken by the air and is cooled to condense and liquefy.

The refrigerant liquefied in the radiator 4 flows out from the radiator 4 and then flows through the refrigerant pipes 13E and 13J to reach the outdoor expansion valve 6. The refrigerant flowing into the outdoor expansion valve 6 is decompressed therein, and then flows into the outdoor heat exchanger 7. The refrigerant flowing into the outdoor heat exchanger 7 evaporates, and the heat is pumped up from the outdoor air passed by running or the outdoor blower 15 (heat absorption). In other words, the refrigerant circuit R functions as a heat pump. Then, the low-temperature refrigerant flowing out from the outdoor heat exchanger 7 flows through the refrigerant pipe 13A, the refrigerant pipe 13D, the solenoid valve 21, and the check valve 40 successively, and flows from the refrigerant pipe 13C into the accumulator 12 to perform gas-liquid separation, and the gas refrigerant is then sucked into the compressor 2, thereby repeating this circulation. The air heated in the radiator 4 is blown out from the outlet 29, thereby performing the heating of the vehicle interior.

The controller 32 calculates a target radiator pressure PCO (a target value of the pressure PCI of the radiator 4) from a target heater temperature TCO (a target value of a heating temperature TH to be described later which is a temperature of the air on a leeward side of the radiator 4) calculated from an after-mentioned target outlet temperature TAO, and controls the number of revolutions of the compressor 2 on the basis of the target radiator pressure PCO and the refrigerant pressure of the radiator 4 which is detected by the radiator pressure sensor 47 (the radiator pressure PCI that is a high pressure of the refrigerant circuit R). Further, the controller controls a valve position of the outdoor expansion valve 6 on the basis of the temperature (the radiator temperature TCI) of the radiator 4 which is detected by the radiator temperature sensor 46 and the radiator pressure PCI detected by the radiator pressure sensor 47, and controls a subcool degree of the refrigerant in an outlet of the radiator 4. The target heater temperature TCO is basically TCO=TAO, but a predetermined limit of controlling is provided.

(2) Dehumidifying and Heating Operation

Figure 4:
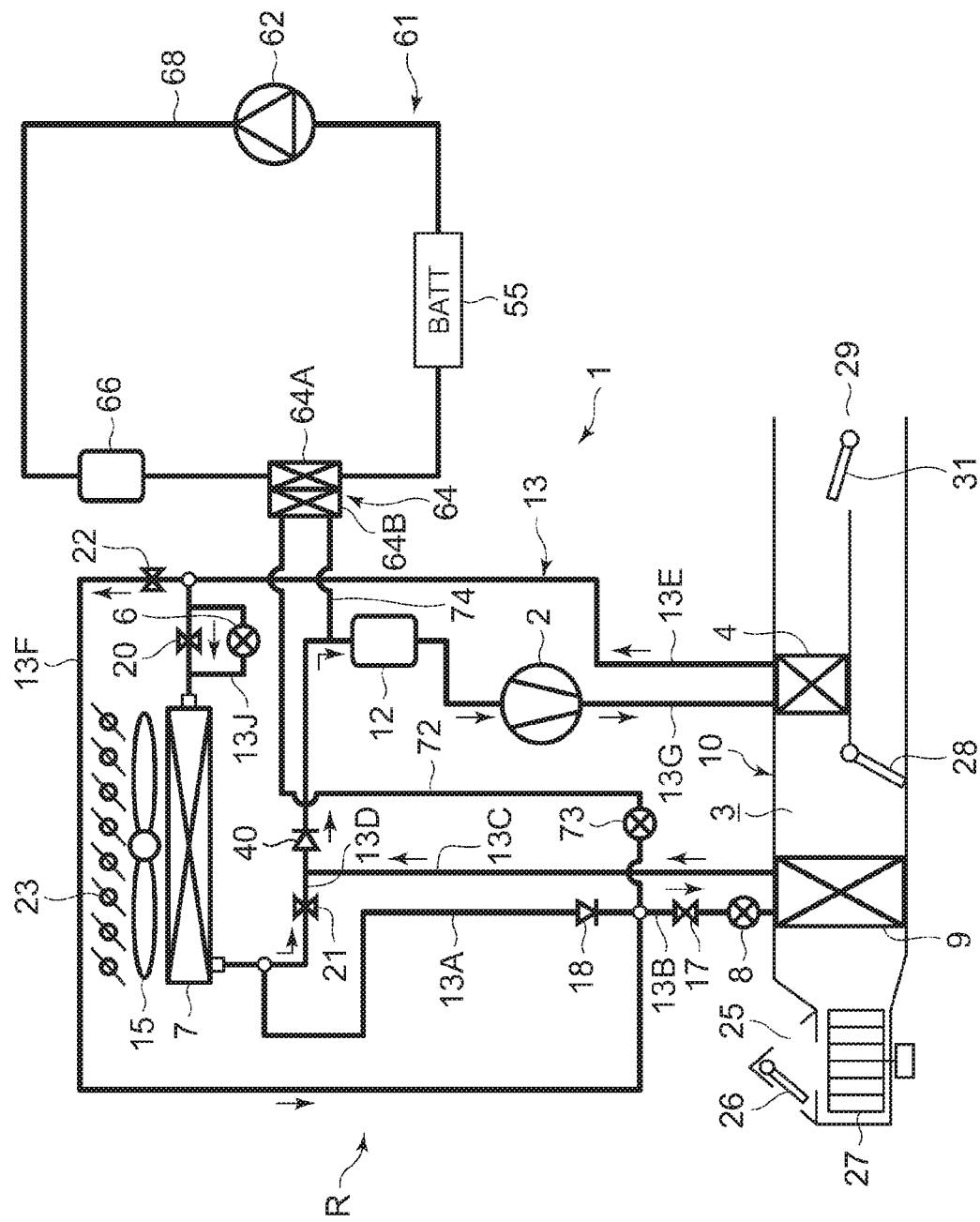
FIG. 4 is a diagram describing a dehumidifying and heating operation by the controller of FIG. 2.

Next, description will be made as to the dehumidifying and heating operation with reference to FIG. 4. FIG. 4 shows the flow (solid line arrows) of the refrigerant of the refrigerant circuit R in the dehumidifying and heating operation. In the dehumidifying and heating operation, the controller 32 opens the solenoid valve 22 and the solenoid valve 17 in the above state of the heating operation. Further, the shutter 23 is opened. In consequence, a part of the condensed refrigerant flowing into the refrigerant pipe 13E through the radiator 4 is distributed, the distributed refrigerant flows through the solenoid valve 22 into the refrigerant pipe 13F and flows from the refrigerant pipe 13B into the indoor expansion valve 8, and the residual refrigerant flows through the outdoor expansion valve 6. That is, the distributed part of the refrigerant is decompressed in the indoor expansion valve 8, and then flows into the heat absorber 9 to evaporate.

The controller 32 controls a valve position of the indoor expansion valve 8 to maintain a superheat degree (SH) in an outlet of the heat absorber 9 at a predetermined value, but water in the air blown out from the indoor blower 27 coagulates to adhere to the heat absorber 9 by a heat absorbing operation of the refrigerant which occurs in the heat absorber 9 at this time, and hence, the air is cooled and dehumidified. The distributed residual refrigerant flowing into the refrigerant pipe 13J is decompressed in the outdoor expansion valve 6, and then evaporates in the outdoor heat exchanger 7.

The refrigerant evaporated in the heat absorber 9 flows out to the refrigerant pipe 13C to join the refrigerant (the refrigerant from the outdoor heat exchanger 7) from the refrigerant pipe 13D, and then flows through the check valve 40 and the accumulator 12 successively to be sucked into the compressor 2, thereby repeating this circulation. The air dehumidified in the heat absorber 9 is reheated in the process of passing the radiator 4, thereby performing the dehumidifying and heating of the vehicle interior.

The controller 32 controls the number of revolutions of the compressor 2 on the basis of the target radiator pressure PCO calculated from the target heater temperature TCO and the radiator pressure PCI detected by the radiator pressure sensor 47 (the high pressure of the refrigerant circuit R), and the controller controls the valve position of the outdoor expansion valve 6 on the basis of the temperature (the heat absorber temperature Te) of the heat absorber 9 which is detected by the heat absorber temperature sensor 48.

(3) Internal Cycle Operation

Figure 5:
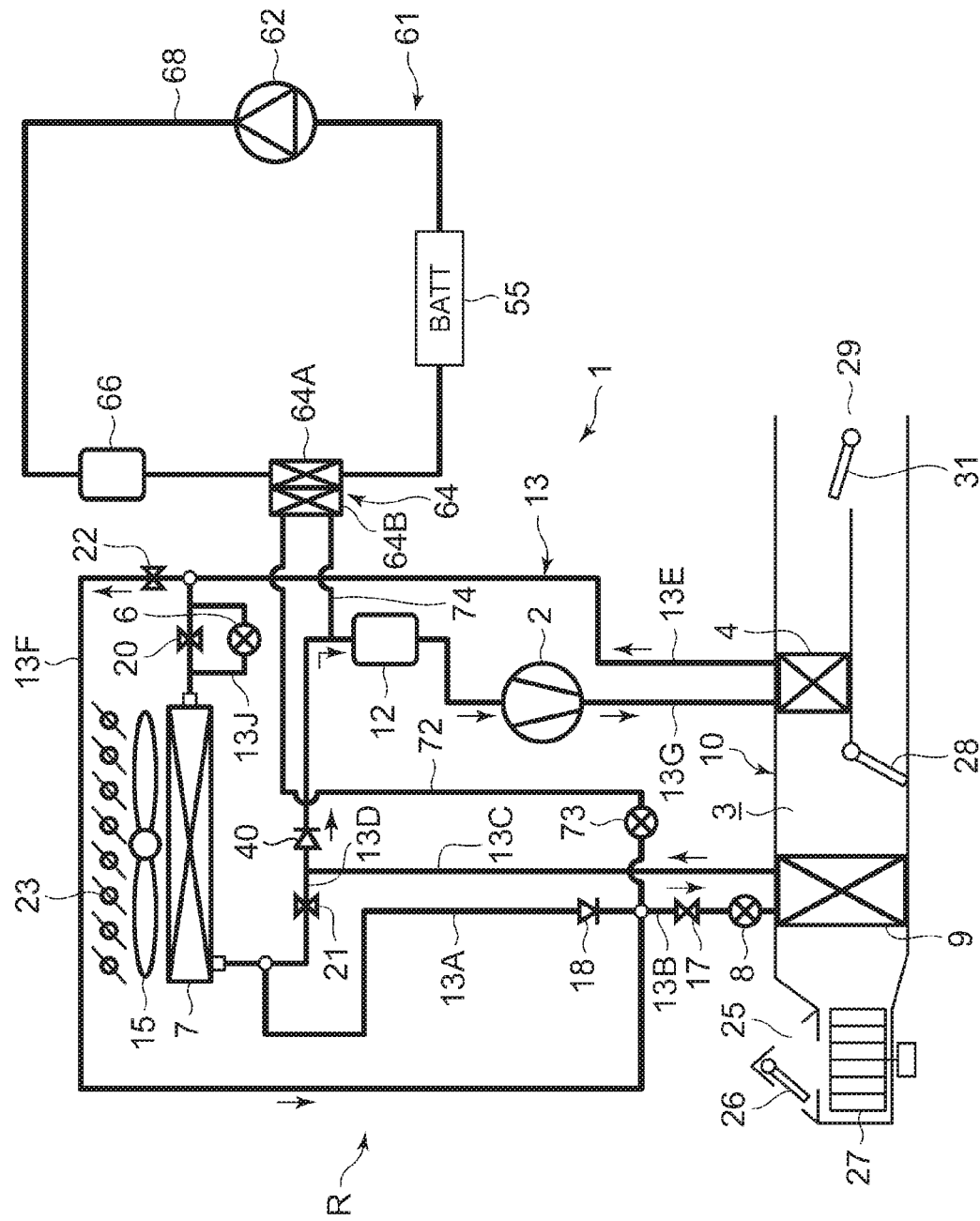
FIG. 5 is a diagram describing an internal cycle operation by the controller of FIG. 2.

Next, description will be made as to the internal cycle operation with reference to FIG. 5. FIG. 5 shows the flow (solid line arrows) of the refrigerant of the refrigerant circuit R in the internal cycle operation. In the internal cycle operation, the controller 32 fully closes the outdoor expansion valve 6 in the above state of the dehumidifying and heating operation (a fully-closed position). However, the solenoid valve 21 is maintained in an opened state, and the refrigerant outlet of the outdoor heat exchanger 7 is made to communicate with the refrigerant suction side of the compressor 2. That is, this internal cycle operation is a state where the outdoor expansion valve 6 is fully closed under the control of the outdoor expansion valve 6 in the dehumidifying and heating operation, and hence, this internal cycle operation can also be grasped as a part of the dehumidifying and heating operation (the shutter 23 being opened).

However, the outdoor expansion valve 6 is closed, thereby obstructing inflow of the refrigerant into the outdoor heat exchanger 7, and hence, all the condensed refrigerant flowing through the radiator 4 into the refrigerant pipe 13E flows through the solenoid valve 22 to the refrigerant pipe 13F. Then, the refrigerant flowing through the refrigerant pipe 13F flows from the refrigerant pipe 13B through the solenoid valve 17 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, and hence, the air is cooled and dehumidified.

The refrigerant evaporated in the heat absorber 9 flows into the refrigerant pipe 13C and flows through the check valve 40 and the accumulator 12 successively to be sucked into the compressor 2, thereby repeating this circulation. The air dehumidified in the heat absorber 9 is reheated in the process of passing the radiator 4, thereby performing the dehumidifying and heating of the vehicle interior, but in this internal cycle operation, the refrigerant circulates between the radiator 4 (heat radiation) and the heat absorber 9 (heat absorption) which are present in the air flow passage 3 on an indoor side, and hence, the heat is not pumped up from the outdoor air, but the heating capability for a consumed power of the compressor 2 is exerted. The whole amount of the refrigerant flows through the heat absorber 9 which exerts a dehumidifying operation, and hence, as compared with the above dehumidifying and heating operation, a dehumidifying capability is higher, but the heating capability becomes low.

Further, the outdoor expansion valve 6 is closed but the solenoid valve 21 is opened, and the refrigerant outlet of the outdoor heat exchanger 7 communicates with the refrigerant suction side of the compressor 2. Hence, the liquid refrigerant in the outdoor heat exchanger 7 flows out to the refrigerant pipe 13C through the refrigerant pipe 13D and the solenoid valve 21 and is recovered to the accumulator 12, so that the outdoor heat exchanger 7 is subjected to a state of the gas refrigerant therein. Thus, as compared with the case where the solenoid valve 21 is closed, the amount of the refrigerant circulated in the refrigerant circuit R is increased, thereby making it possible to enhance the heating capability of the radiator 4 and the dehumidifying capability of the heat absorber 9.

The controller 32 controls the number of revolutions of the compressor 2 on the basis of the temperature of the heat absorber 9 or the above-mentioned radiator pressure PCI (the high pressure of the refrigerant circuit R). At this time, the controller 32 selects a smaller compressor target number of revolutions from compressor target numbers of revolutions obtainable by either of calculations from the temperature of the heat absorber 9 and the radiator pressure PCI, to control the compressor 2.

(4) Dehumidifying and Cooling Operation

Figure 6:
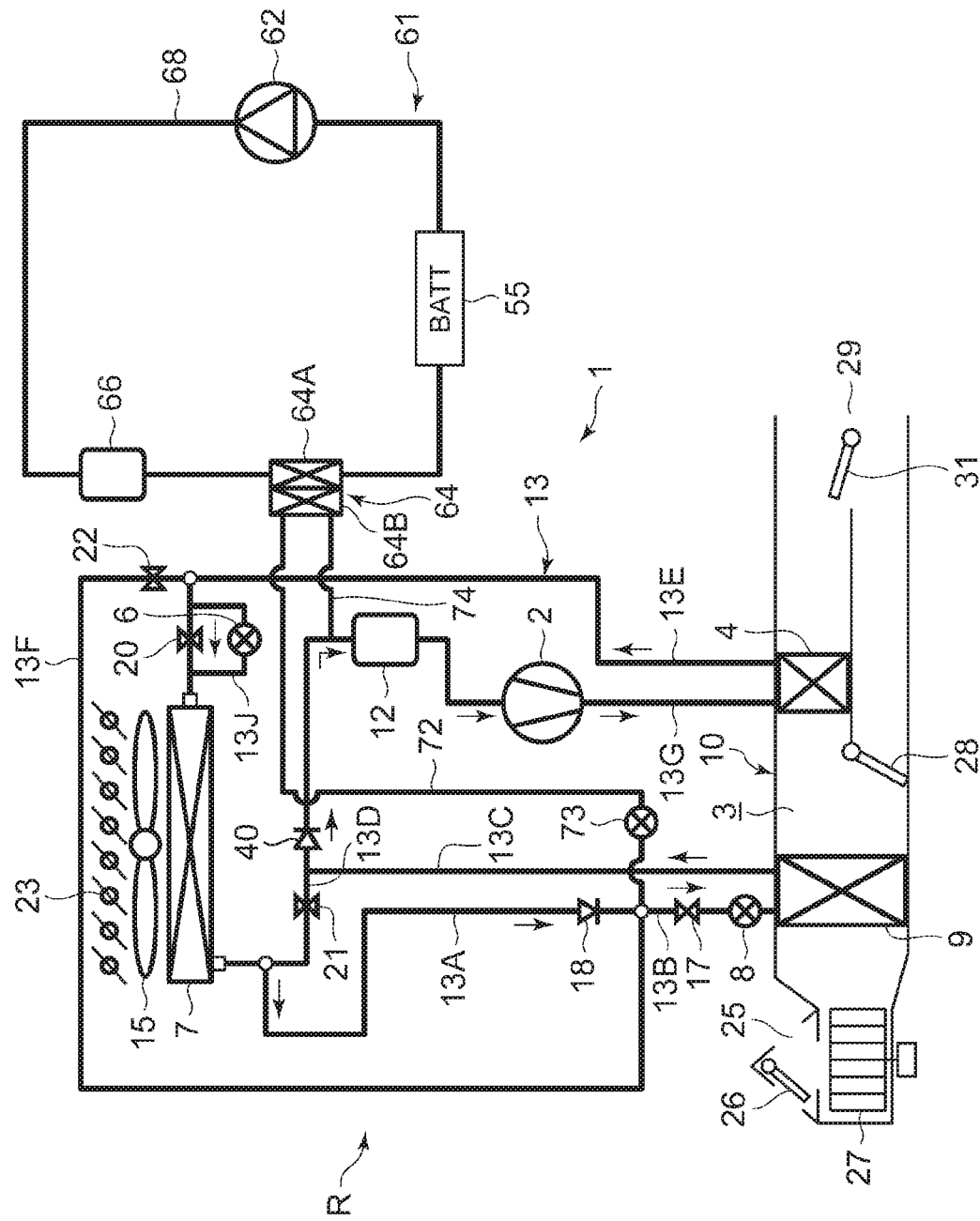
FIG. 6 is a diagram describing a dehumidifying and cooling operation by the controller of FIG. 2.

Next, description will be made as to the dehumidifying and cooling operation with reference to FIG. 6. FIG. 6 shows the flow (solid line arrows) of the refrigerant of the refrigerant circuit R in the dehumidifying and cooling operation. In the dehumidifying and cooling operation, the controller 32 opens the solenoid valve 17 and closes the solenoid valve 21. The controller also closes the solenoid valve 22 and the solenoid valve 20. Then, the controller operates the compressor 2 and the respective blowers 15 and 27, and the air mix damper 28 has a state of adjusting a ratio at which the air blown out from the indoor blower 27 is to be passed through the radiator 4. Further, the shutter 23 is opened. Consequently, the high-temperature high-pressure gas refrigerant discharged from the compressor 2 flows into the radiator 4. The air in the air flow passage 3 passes through the radiator 4, and hence, the air in the air flow passage 3 is heated by the high-temperature refrigerant in the radiator 4, whereas the refrigerant in the radiator 4 has the heat taken by the air and is cooled to condense and liquefy.

The refrigerant flowing out from the radiator 4 flows through the refrigerant pipe 13E to reach the outdoor expansion valve 6, and flows through the outdoor expansion valve 6 controlled to slightly open, to flow into the outdoor heat exchanger 7. The refrigerant flowing into the outdoor heat exchanger 7 is cooled by the running therein or the outdoor air passed through the outdoor blower 15 to condense. The refrigerant flowing out from the outdoor heat exchanger 7 flows through the refrigerant pipe 13A and the check valve 18 to enter the refrigerant pipe 13B, and further flows through the solenoid valve 17 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, and hence, the air is cooled and dehumidified.

The refrigerant evaporated in the heat absorber 9 passes the check valve 40 through the refrigerant pipe 13C to reach the accumulator 12, and flows therethrough to be sucked into the compressor 2, thereby repeating this circulation. The air cooled and dehumidified in the heat absorber 9 is reheated in the process of passing the radiator 4 (reheating: a radiation capability is lower than that during the heating), thereby performing the dehumidifying and cooling of the vehicle interior.

The controller 32 controls, based on the temperature (the heat absorber temperature Te) of the heat absorber 9 which is detected by the heat absorber temperature sensor 48, and a target heat absorber temperature TEO being its target value, the number of revolutions of the compressor 2 to set the heat absorber temperature Te to the target heat absorber temperature TEO, and controls, based on the radiator pressure PCI (the high pressure of the refrigerant circuit R) detected by the radiator pressure sensor 47 and the target radiator pressure PCO (the target value of the radiator pressure PCI) calculated from the target heater temperature TCO, the valve position of the outdoor expansion valve 6 to set the radiator pressure PCI to the target radiator pressure PCO, thereby obtaining a required amount of reheat by the radiator 4.

(5) Cooling Operation

Figure 7:
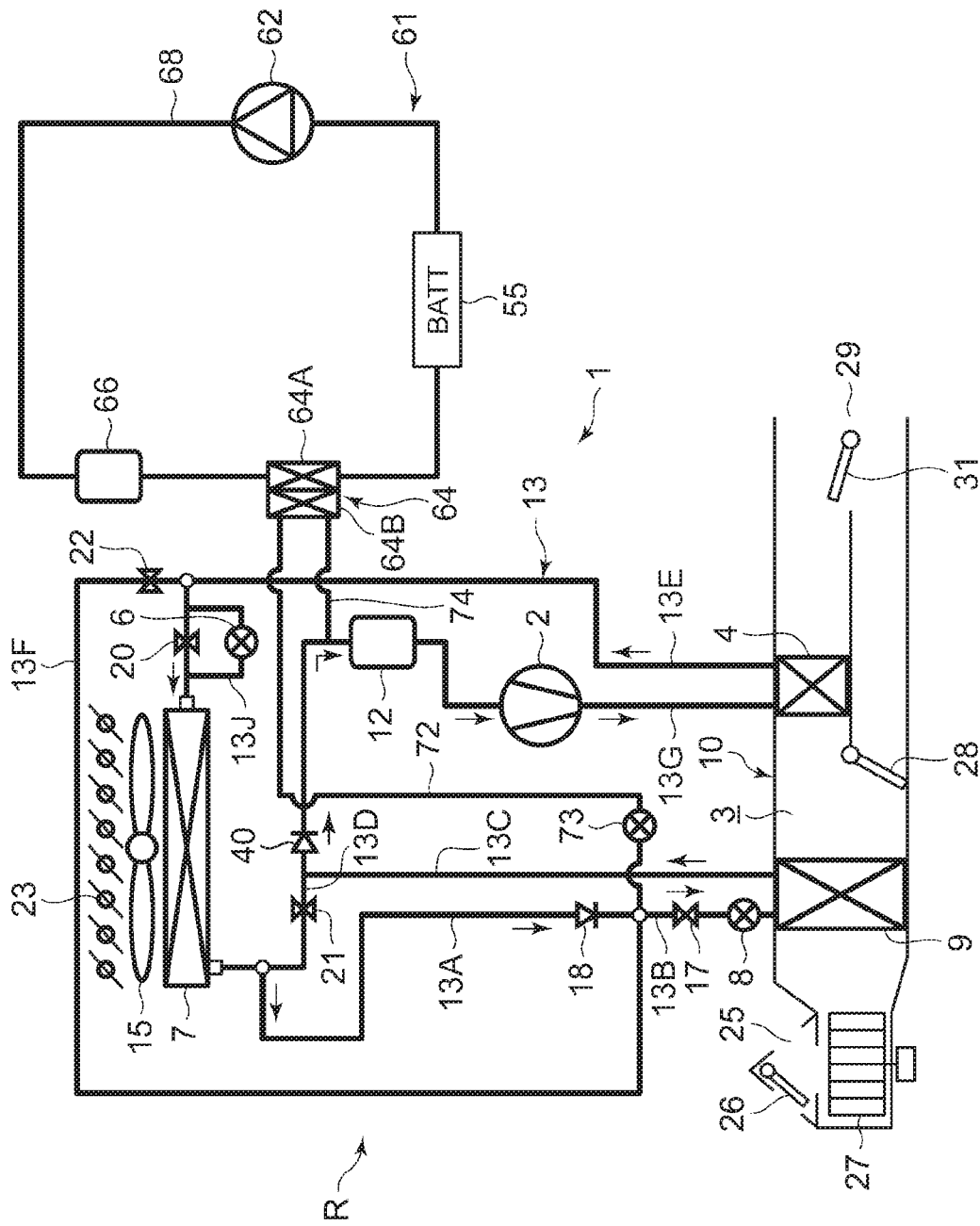
FIG. 7 is a diagram describing a cooling operation by the controller of FIG. 2.

Next, description will be made as to the cooling operation with reference to FIG. 7. FIG. 7 shows the flow (solid line arrows) of the refrigerant of the refrigerant circuit R in the cooling operation. In the cooling operation, the controller 32 opens the solenoid valve 20 in the above state of the dehumidifying and cooling operation (the valve position of the outdoor expansion valve 6 is free). It is to be noted that the air mix damper 28 has a state of adjusting a ratio at which the air is to be passed through the radiator 4. Further, the shutter 23 is opened.

In consequence, the high-temperature high-pressure gas refrigerant discharged from the compressor 2 flows into the radiator 4. The air in the air flow passage 3 is passed through the radiator 4 but its ratio becomes small (because of only reheat during the cooling). The refrigerant therefore only passes the radiator, and the refrigerant flowing out from the radiator 4 flows through the refrigerant pipe 13E to reach the outdoor expansion valve 6. At this time, the solenoid valve 20 is opened, and hence, the refrigerant flows through the solenoid valve 20 to pass the refrigerant pipe 13J, and flows into the outdoor heat exchanger 7 as it is, in which the refrigerant is cooled by the running therein or the outdoor air to pass through the outdoor blower 15, to condense and liquefy. The refrigerant flowing out from the outdoor heat exchanger 7 flows through the refrigerant pipe 13A and the check valve 18 to enter the refrigerant pipe 13B, and further flows through the solenoid valve 17 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, and hence, the air is cooled.

The refrigerant evaporated in the heat absorber 9 flows out to the refrigerant pipe 13C and passes the check valve 40 to reach the accumulator 12, and flows therethrough to be sucked into the compressor 2, thereby repeating this circulation. The air cooled and dehumidified in the heat absorber 9 is blown out from the outlet 29 to the vehicle interior, thereby performing the cooling of the vehicle interior. In this cooling operation, the controller 32 controls the number of revolutions of the compressor 2 on the basis of the temperature (the heat absorber temperature Te) of the heat absorber 9 which is detected by the heat absorber temperature sensor 48.

(6) Changing of Air Conditioning Operation and Control of Air Mix Damper 28

The controller 32 calculates the above-mentioned target outlet temperature TAO from the following formula (I). The target outlet temperature TAO is a target value of the temperature of the air to be blown out from the outlet 29 to the vehicle interior.

$$TAO=(Tset-Tin) \times K + Tbal(f(Tset, SUN, Tam)) \quad (I)$$

where Tset is a predetermined temperature of the vehicle interior which is set by the air conditioning operating portion 53, Tin is a temperature of the vehicle interior air which is detected by the indoor air temperature sensor 37, K is a coefficient, and Tbal is a balance value calculated from the predetermined temperature Tset, a solar radiation amount SUN detected by the solar radiation sensor 51, and the outdoor air temperature Tam detected by the outdoor air temperature sensor 33. Furthermore, in general, the lower the outdoor air temperature Tam is, the higher the target outlet temperature TAO becomes, and the higher the outdoor air temperature Tam is, the lower the target outlet temperature TAO becomes.

Then, the controller 32 selects any air conditioning operation from the above respective air conditioning operations on the basis of the outdoor air temperature Tam detected by the outdoor air temperature sensor 33 and the target outlet temperature TAO on startup. Furthermore, after the startup, the controller selects and changes the above respective air conditioning operations in accordance with changes of environments and setting conditions such as the outdoor air temperature Tam and the target outlet temperature TAO.

Further, the controller 32 controls the air mix damper 28 at an air volume ratio SW obtained in a formula of SW=(TAO−Te)/(TH−Te). The air volume ratio SW is a ratio at which the air passed through the heat absorber 9 is to be passed through the radiator 4, and changes between 0 (at which the air is not passed through the radiator 4) and 1 (at which all the air is passed through the radiator 4).

TH used to calculate the air volume ratio SW of the air mix damper 28 is a temperature (a heating temperature) of the air on the leeward side of the aforementioned radiator 4. The controller 32 estimates the TH from a first-order lag calculation formula (II) shown below:

$$TH=(INTL \times THO + Tau \times THz)/(Tau + INTL) \quad (II)$$

where INTL is a calculation period (constant), Tau is a time constant of a first-order lag, THO is a steady-state value of the heating temperature TH in a steady state before a first-order lag calculation, and THz is a previous value of the heating temperature TH. Estimating the heating temperature TH in this manner makes it unnecessary to provide a special temperature sensor. Incidentally, the controller 32 changes the above time constant Tau and steady-state value THO in accordance with the aforementioned operation mode to thereby make the above-described estimation formula (II) different depending on the operation mode to estimate the heating temperature TH.

(7) Temperature Adjustment of Battery 55

Figure 8:
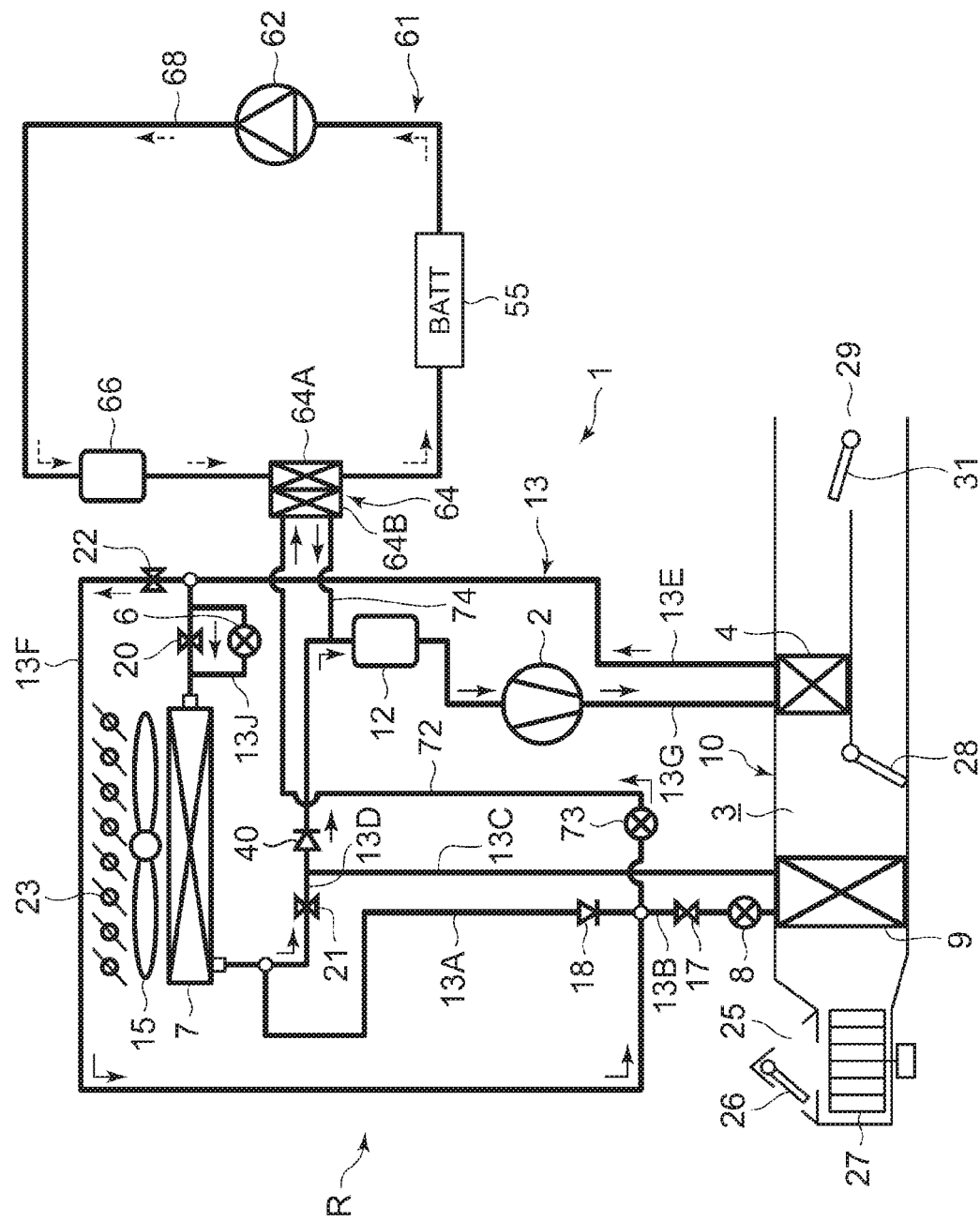
FIG. 8 is a diagram describing a first heat medium heat absorption/heating mode by the controller of FIG. 2.
Figure 9:
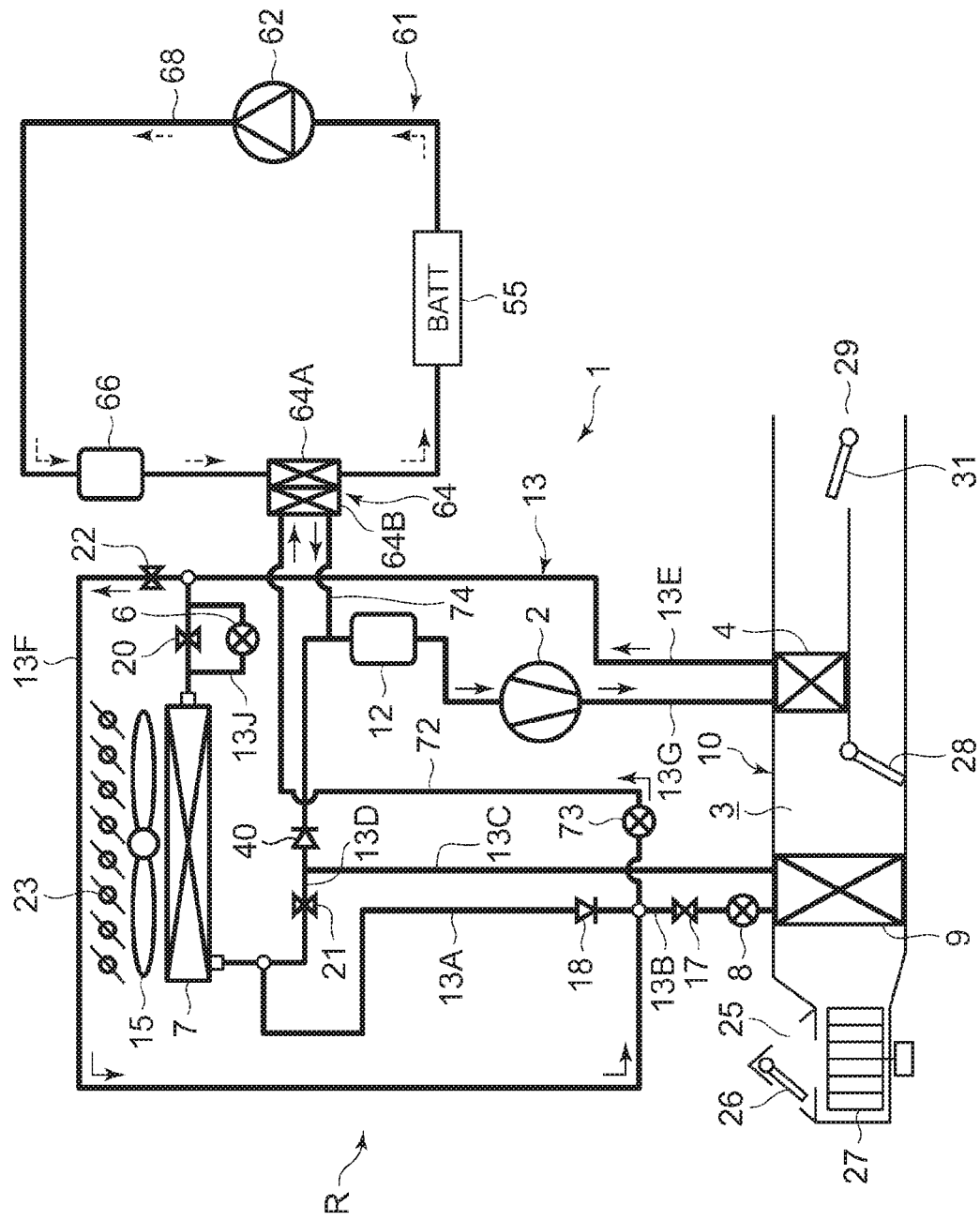
FIG. 9 is a diagram describing a second heat medium heat absorption/heating mode by the controller of FIG. 2.

Next, description will be made as to temperature adjustment control of the battery 55 by the controller 32 with reference to FIGS. 8 and 9. When the battery 55 performs charging/discharging in a state in which its temperature becomes high due to its self-heat generation or the like as described above, its deterioration progresses. Thus, the controller 32 of the vehicle air-conditioning device 1 of the embodiment cools the temperature of the battery 55 to within an appropriate temperature range by the heat-generating equipment temperature adjusting device 61 while executing the air conditioning operation as described above. It is to be noted that since the appropriate temperature range of the battery 55 is generally from above +25° C. to below +45°, the target battery temperature TBO (e.g., +35° C.) being the target value of the temperature (the battery temperature Tb) of the battery 55 is set to within the appropriate temperature range in the embodiment.

(7-1) First Heat Medium Heat Absorption/Heating Mode (Heat Medium Heat Absorption/Heating Mode)

In the heating operation (FIG. 3), the controller 32 calculates a target heating capability TGQhp being the heating capability of the vehicle interior required for the radiator 4, and a heating capability Qhp generable by the radiator 4 by using the following formulas (III) and (IV), for example.

$$TGQhp=(TCO-Te) \times Cpa \times \rho \times Qair \quad (III)$$

$$Qhp=f(Tam, NC, BLV, VSP, FANVout, Te) \quad (IV)$$

where Te is a temperature of the heat absorber 9 detected by the heat absorber temperature sensor 48, Cpa is a specific heat of air flowing into the radiator 4 [kj/kg·K], ρ is a density of the air flowing into the radiator 4 (specific volume) [kg/m³], Qair is an amount of the air passing through the radiator 4 [m³/h] (estimated from the blower voltage BLV of the indoor blower 27, etc.), VSP is a velocity obtained from the velocity sensor 52, and FANVout is a voltage of the outdoor blower 15.

Further, the controller 32 calculates a required battery cooling capability Qbat being a cooling capability of the battery 55 required for the heat-generating equipment temperature adjusting device 61 by using, for example, the following formula (V) on the basis of the temperature (the battery temperature Tb) of the battery 55 detected by the battery temperature sensor 76 and the above-mentioned target battery temperature TBO.

$$Qbat=(Tb-TBO) \times k1 \times k2 \quad (V)$$

where k1 is a specific heat of the heat medium circulated in the heat-generating equipment temperature adjusting device 61 [kj/kg·K], and k2 is a flow rate of the heat medium [m³/h]. Incidentally, the formula of calculating the required battery cooling capability Qbat is not limited to the above, but the required battery cooling capability may be calculated in addition to other factors related to battery cooling other than the above.

When the battery temperature Tb is lower than the target battery temperature TBO (Tb<TBO), the required battery cooling capability Qbat calculated in the above formula (V) becomes minus, and hence, in the embodiment, the controller 32 fully closes the auxiliary expansion valve 73 and also stops the heat-generating equipment temperature adjusting device 61. On the other hand, when the battery temperature Tb rises by charging/discharging or the like and becomes higher than the target battery temperature TBO during the above-described heating operation (TBO<Tb), the required battery cooling capability Qbat calculated in the formula (V) is turned plus, and hence, in the embodiment, the controller 32 opens the auxiliary expansion valve 73 and operates the heat-generating equipment temperature adjusting device 61 to start the cooling of the battery 55.

In that case, the controller 32 compares both of the above-described target heating capability TGQhp and required battery cooling capability Qbat on the basis of the target heating capability TGQhp and the required battery cooling capability Qbat, and changes and executes the first heat medium heat absorption/heating mode to be described here and a second heat medium heat absorption/heating mode to be described later in the embodiment (both being the heat medium heat absorption/heating mode in the present invention).

Firstly, when the target heating capability TGQhp is larger than the required battery cooling capability Qbat in the situation in which a heating load of the vehicle interior is large (e.g., the temperature of indoor air is low), and the amount of heat generated from the battery 55 is small (a cooling load is small) (TGQhp>Qbat), the controller 32 executes the first heat medium heat absorption/heating mode. FIG. 8 shows the flow (solid line arrows) of the refrigerant of the refrigerant circuit R in the first heat medium heat absorption/heating mode, and the flow (broken line arrows) of the heat medium of the heat-generating equipment temperature adjusting device 61.

In the first heat medium heat absorption/heating mode, the controller 32 has a state of, in the state of the heating operation of the refrigerant circuit R shown in FIG. 3, further opening the solenoid valve 22 and also opening the auxiliary expansion valve 73 to control its valve position. Then, the controller operates the circulating pump 62 of the heat-generating equipment temperature adjusting device 61. Consequently, a part of the refrigerant flowing out from the radiator 4 is distributed on a refrigerant upstream side of the outdoor expansion valve 6 and flows through the refrigerant pipe 13F to reach a refrigerant upstream side of the solenoid valve 17. The refrigerant then enters the branch pipe 72 and is decompressed in the auxiliary expansion valve 73 and then flows through the branch pipe 72 into the refrigerant flow passage 64B of the refrigerant-heat medium heat exchanger 64 to evaporate. At this time, a heat absorbing operation is exerted. A circulation is repeated in which the refrigerant evaporated in the refrigerant flow passage 64B flows through the refrigerant pipe 74, the refrigerant pipe 13C, and the accumulator 12 successively, and is sucked into the compressor 2 (this is indicated by the solid line arrows in FIG. 8).

On the other hand, the heat medium discharged from the circulating pump 62 flows into the heat medium pipe 68 through the heat medium heating heater 66 to reach the heat medium flow passage 64A of the refrigerant-heat medium heat exchanger 64, where heat is absorbed therefrom by the refrigerant evaporated in the refrigerant flow passage 64B, whereby the heat medium is cooled. The heat medium cooled by the heat absorbing operation of the refrigerant flows out from the refrigerant-heat medium heat exchanger 64 and reaches the battery 55 to cool the battery 55, and the heat medium is then sucked into the circulating pump 62, thereby repeating this circulation (indicated by the broken line arrows in FIG. 8).

Thus, in the first heat medium heat absorption/heating mode, the refrigerant of the refrigerant circuit R evaporates in the outdoor heat exchanger 7 and the refrigerant-heat medium heat exchanger 64 and absorbs heat from the outdoor air, and absorbs heat even from the heat medium (battery 55) of the heat-generating equipment temperature adjusting device 61. Consequently, the heat is pumped up from the battery 55 through the heat medium, and the pumped-up heat can be transferred to the radiator 4 and utilized for the heating of the vehicle interior, while cooling the battery 55.

In the first heat medium heat absorption/heating mode, when it is not possible to achieve the target heating capability TGQhp by the above-described heating capability Qhp of radiator 4 even by the heat absorption from the outdoor air and the heat absorption from the battery 55 as described above (TGQhp>Qhp), the controller 32 allows the heat medium heating heater 66 to generate heat (energization).

When the heat medium heating heater 66 generates heat, the heat medium discharged from the circulating pump 62 of the heat-generating equipment temperature adjusting device 61 is heated in the heat medium heating heater 66 and then flows into the heat medium flow passage 64A of the refrigerant-heat medium heat exchanger 64. Hence, the heat of the heat medium heating heater 66 is also pumped up by the refrigerant evaporated in the refrigerant flow passage 64B, whereby the heating capability Qhp by the radiator 4 is increased, thereby making it possible to achieve the target heating capability TGQhp. Incidentally, the controller 32 stops the heat generation of the heat medium heating heater 66 when the target heating capability TGQhp has been achieved for the heating capability Qhp (non-energization).

(7-2) Second Heat Medium Heat Absorption/Heating Mode

Next, when the heating load of the vehicle interior and the cooling load of the battery 55 are almost the same, i.e., when the target heating capability TGQhp and the required battery cooling capability Qbat are equal or close to each other (TGQhp≈Qbat), the controller 32 executes the second heat medium heat absorption/heating mode. FIG. 9 shows the flow of the refrigerant of the refrigerant circuit R in the second heat medium heat absorption/heating mode (solid line arrows), and the flow of the heat medium of the heat-generating equipment temperature adjusting device 61 (broken line arrows).

In the second heat medium heat absorption/heating mode, the controller 32 has a state of closing the solenoid valves 17, 20, and 21, fully closing the outdoor expansion valve 6, opening the solenoid valve 22, and also opening the auxiliary expansion valve 73 to control its valve position. Then, the controller operates the compressor 2 and the indoor blower 27 and also operates the circulating pump 62 of the heat-generating equipment temperature adjusting device 61. Consequently, all the refrigerant flowing out from the radiator 4 flows into the solenoid valve 22 and reaches the refrigerant upstream side of the solenoid valve 17 through the refrigerant pipe 13F. The refrigerant then enters the branch pipe 72 and is decompressed in the auxiliary expansion valve 73, and then flows through the branch pipe 72 into the refrigerant flow passage 64B of the refrigerant-heat medium heat exchanger 64 to evaporate. At this time, a heat absorbing operation is exerted. A circulation is repeated in which the refrigerant evaporated in the refrigerant flow passage 64B flows through the refrigerant pipe 74, the refrigerant pipe 13C, and the accumulator 12 successively, and is sucked into the compressor 2 (this is indicated by the solid line arrows in FIG. 9).

On the other hand, the heat medium discharged from the circulating pump 62 flows into the heat medium pipe 68 through the heat medium heating heater 66 to reach the heat medium flow passage 64A of the refrigerant-heat medium heat exchanger 64, where heat is absorbed therefrom by the refrigerant evaporated in the refrigerant flow passage 64B, whereby the heat medium is cooled. The heat medium cooled by the heat absorbing operation of the refrigerant flows out from the refrigerant-heat medium heat exchanger 64 and reaches the battery 55 to cool the battery 55, and the heat medium is then sucked into the circulating pump 62, thereby repeating this circulation (indicated by the broken line arrows in FIG. 9).

Thus, in the second heat medium heat absorption/heating mode, the refrigerant of the refrigerant circuit R evaporates in the refrigerant-heat medium heat exchanger 64 and absorbs heat from only the heat medium (battery 55) of the heat-generating equipment temperature adjusting device 61. Consequently, the refrigerant does not flow into the outdoor heat exchanger 7, and pumps up the heat from only the battery 55 through the heat medium. Therefore, while eliminating the problem of frosting to the outdoor heat exchanger 7, the battery 55 is cooled and the heat pumped up from the battery 55 is transferred to the radiator 4, thereby making it possible to heat the vehicle interior.

Incidentally, even in the case of the aforementioned dehumidifying and heating operation (FIG. 4), internal cycle operation (FIG. 5), dehumidifying and cooling operation (FIG. 6) and cooling operation (FIG. 7), the auxiliary expansion valve 73 is opened to control its valve position, and the circulating pump 62 is operated, thereby evaporating the refrigerant in the refrigerant flow passage 64B of the refrigerant-heat medium heat exchanger 64 and absorbing heat from the heat medium, whereby the battery 55 is cooled to enable its temperature to be adjusted.

(8) Changing Control from Heating Operation to First and Second Heat Medium Heat Absorption/Heating Modes when there is a Possibility that Outdoor Air Heat Absorption Becomes Impossible Next, description will be made as to changing control from the heating mode to the first and second heat medium heat absorption/heating modes when there is a possibility that the refrigerant will not be able to absorb heat from the outdoor air in the outdoor heat exchanger 7 during the heating operation (FIG. 3) (impossibility of heat absorption) with reference to FIGS. 10 to 14.

Figure 10:
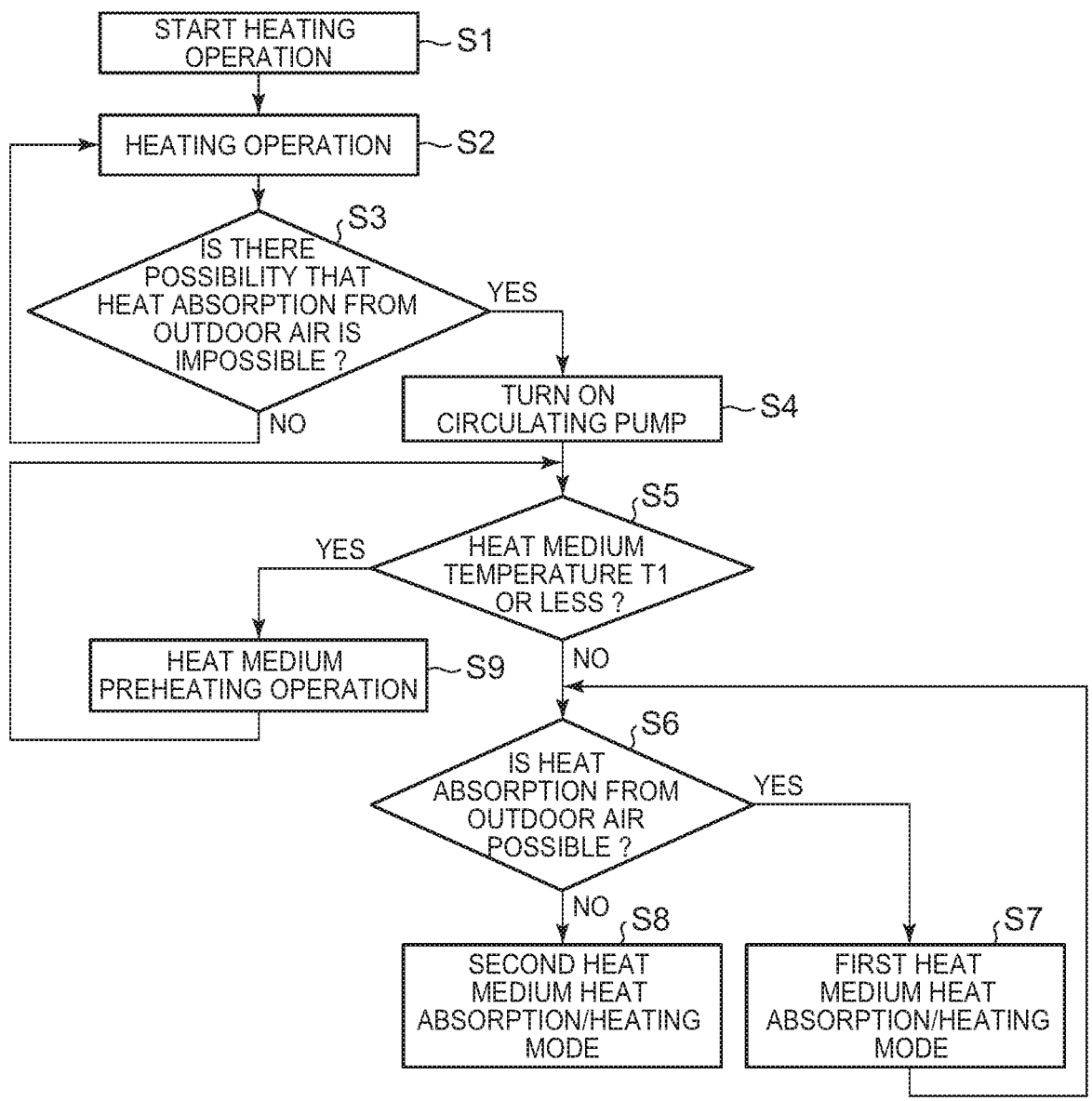
FIG. 10 is a flowchart describing changing control from the heating operation to the first heat medium heat absorption/heating mode and the second heat medium heat absorption/heating mode by the controller of FIG. 2 when there is a possibility that outdoor air heat absorption becomes impossible.
Figure 11:
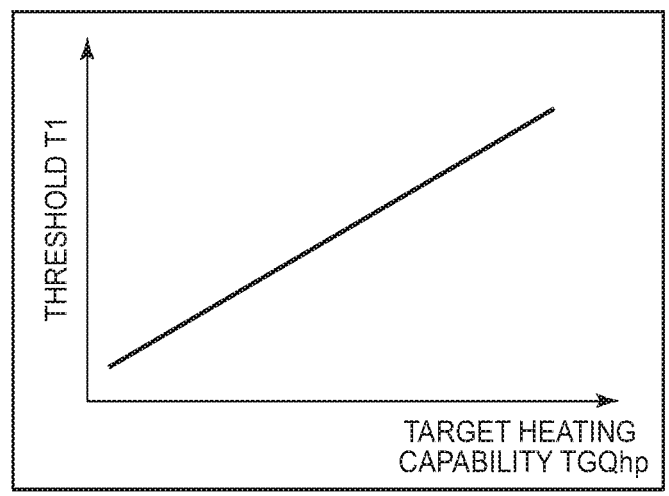
FIG. 11 is a diagram describing a heat medium heat absorption transitionable heat medium temperature MAP that the controller of FIG. 2 has.

After the aforementioned heating operation has started in Step S1 of FIG. 10, the controller 32 executes Step S3 while executing the heating operation in Step S2 to judge whether there is a possibility that the refrigerant will not be able to absorb heat from the outdoor air in the outdoor heat exchanger 7. A judgment condition in this Step S3 is referred to as an outdoor air heat-unabsorbable prediction and judgment condition. The outdoor air heat-unabsorbable prediction and judgment condition is for example, any of (i) to (v) shown below, or their combination, or all of them.

(i) The suction refrigerant temperature Ts of the compressor 2 detected by the suction temperature sensor 44 is reduced to a predetermined value Ts' or less, (ii) The amount of frosting to the outdoor heat exchanger 7 is increased to a predetermined value Fr1 or higher, (iii) The progress speed of frosting to the outdoor heat exchanger 7 is raised to a predetermined value X1 or higher, (iv) The outdoor air temperature Tam detected by the outdoor air temperature sensor 33 is reduced to a predetermined value Tam1 or less, and (v) The reducing speed of the outdoor air temperature Tam detected by the outdoor air temperature sensor 33 is raised to a predetermined value Y1 or higher.

There occurs a possibility that the refrigerant will not be able to absorb heat from the outdoor air in the outdoor heat exchanger 7 in a state in which the formed frost is grown in the outdoor heat exchanger 7, and in an environment in which the outdoor air temperature Tam is reduced. Incidentally, the above condition (i) is based on the fact that when the outdoor air temperature Tam is reduced or the formed frost is grown in the outdoor heat exchanger 7 to make it difficult to absorb heat from the outdoor air, the suction refrigerant temperature Ts of the compressor 2 is lowered. Further, the amount of frosting and the progress speed of frosting in the above conditions (ii) and (iii) can be determined from the difference between the outdoor heat exchanger temperature TXO and the outdoor heat exchanger pressure PXO of the outdoor heat exchanger 7, and their values (an outdoor heat exchanger temperature TXObase at the time of non-frosting, and an outdoor heat exchanger pressure PXObase at the time of non-frosting, which are determined in advance), for example.

The above respective predetermined values Ts1, Fr1, X1, Tam1, and Y1 are determined by experiments in advance as values at which there occurs a possibility that the refrigerant will not be able to absorb heat from the outdoor air in the outdoor heat exchanger 7. Then, when any of the above conditions (i) to (v), or their combination, or all of them are established in Step S3, the controller 32 determines that there is a possibility that the outdoor air heat-unabsorbable prediction and judgment condition is established, and the refrigerant will not be able to absorb heat from the outdoor air in the outdoor heat exchanger 7, and then proceeds to Step S4 where the controller first operates the circulating pump 62 of the heat-generating equipment temperature adjusting device 61 to circulate the heat medium in the heat medium pipe 68.

Next, the controller 32 judges in Step S5, based on the output of the heat medium temperature sensor 80 whether the temperature (the heat medium temperature Tw) of the heat medium flowing out from the heat medium heating heater 66 is a predetermined threshold T1 or less. In this case, the controller 32 has a heat medium heat-absorption transitionable heat medium temperature MAP shown in FIG. 11. The heat medium heat-absorption transitionable heat medium temperature MAP shows the relation between the aforementioned target heating capability TGQhp and the above threshold T1 being the heat medium temperature Tw at which it is not possible to achieve it. The higher the target heating capability TGQhp of the radiator 4 becomes, the higher the threshold T1 becomes.

Incidentally, the threshold T1 may be determined on the basis of any of the aforementioned target outlet temperature TAO and blower voltage BLV of the indoor blower 27, and the aforementioned target heater temperature TCO, or a combination of those and the target heating capability TGQhp, or all of them even other such a target heating capability TGQhp.

In Step S5, the controller 32 determines the threshold T1 from the heat medium heat-absorption transitionable heat medium temperature MAP and the target heating capability TGQhp at that time, and judges whether the heat medium temperature Tw is the threshold T1 or less. Then, when the heat medium temperature Tw is low and is the threshold T1 or less, the controller 32 determines that the vehicle interior cannot be heated by the heat absorption from the heat medium, and then proceeds from Step S5 to Step S9, where the controller starts a heat medium preheating operation.

In the heat medium preheating operation, the controller 32 performs energization to the heat medium heating heater 66 to generate heat. Consequently, since the heat medium circulated in the circulating pump 62 is heated by the heat medium heating heater 66, the heat medium temperature Tw rises. Then, when the heat medium temperature Tw becomes higher than the threshold T1 (which may be a value (T1+α1) caused to have a predetermined hysteresis α1), the controller 32 proceeds to Step S6.

In this Step S6, the controller 32 judges whether the refrigerant is still able to absorb heat from the outdoor air in the outdoor heat exchanger 7. A judgment condition in this Step S6 is referred to as an outdoor air heat-absorbable judgment condition. The outdoor air heat-absorbable judgment condition is, for example, any of (vi) to (x) shown below, or their combination, or all of them.

(vi) The suction refrigerant temperature Ts of the compressor 2 detected by the suction temperature sensor 44 is a predetermined value Ts2 or higher lower than the predetermined value Ts1, (vii) The amount of frosting to the outdoor heat exchanger 7 is a predetermined value Fr2 or less larger than the predetermined value Fr1, (viii) The progress speed of frosting to the outdoor heat exchanger 7 is a predetermined value X2 or less earlier than the predetermined value X1, (ix) The outdoor air temperature Tam detected by the outdoor air temperature sensor 33 is a predetermined value Tam2 or higher lower than the predetermined value Tam1, and (x) The reducing speed of the outdoor air temperature Tam detected by the outdoor air temperature sensor 33 is a predetermined value Y2 or less earlier than the predetermined value Y1.

The above respective predetermined values Ts2, Fr2, X2, Tam2, and Y2 are determined by experiments in advance as values at which the refrigerant is still able to absorb heat from the outdoor air in the outdoor heat exchanger 7. Then, when any of the above conditions (vi) to (x), or their combination, or all of them are established in Step S6, the controller 32 determines that the outdoor air heat-absorbable judgment condition is established, and the refrigerant is still able to absorb heat from the outdoor air in the outdoor heat exchanger 7, and then proceeds to Step S7 where the controller executes the aforementioned first heat medium heat absorption/heating mode (FIG. 8) (performs changing to the first heat medium heat absorption/heating mode).

In the first heat medium heat absorption/heating mode, as described above, the refrigerant of the refrigerant circuit R evaporates in the outdoor heat exchanger 7 and the refrigerant-heat medium heat exchanger 64 and absorbs heat from the outdoor air, and also absorbs heat from the heat medium of the heat-generating equipment temperature adjusting device 61. It is therefore possible to pump up the heat from the battery 55 and the heat medium heating heater 66 (when energized) and transfer the pumped heat to the radiator 4 to use it for the heating of the vehicle interior.

On the other hand, when the outdoor air heat-absorbable judgment condition is not established in Step S6, the controller determines that the refrigerant is not able to absorb heat from the outdoor air in the outdoor heat exchanger 7, and proceeds to Step S8 where it executes the aforementioned second heat medium heat absorption/heating mode (FIG. 9) (performs changing to the second heat medium heat absorption/heating mode). Further, the controller allows the heat medium heating heater 66 to generate heat as needed. It is thus possible to transfer the heat pumped up from the battery 55 and the heat medium heating heater 66 to the radiator 4 to heat the vehicle interior.

Figure 12:
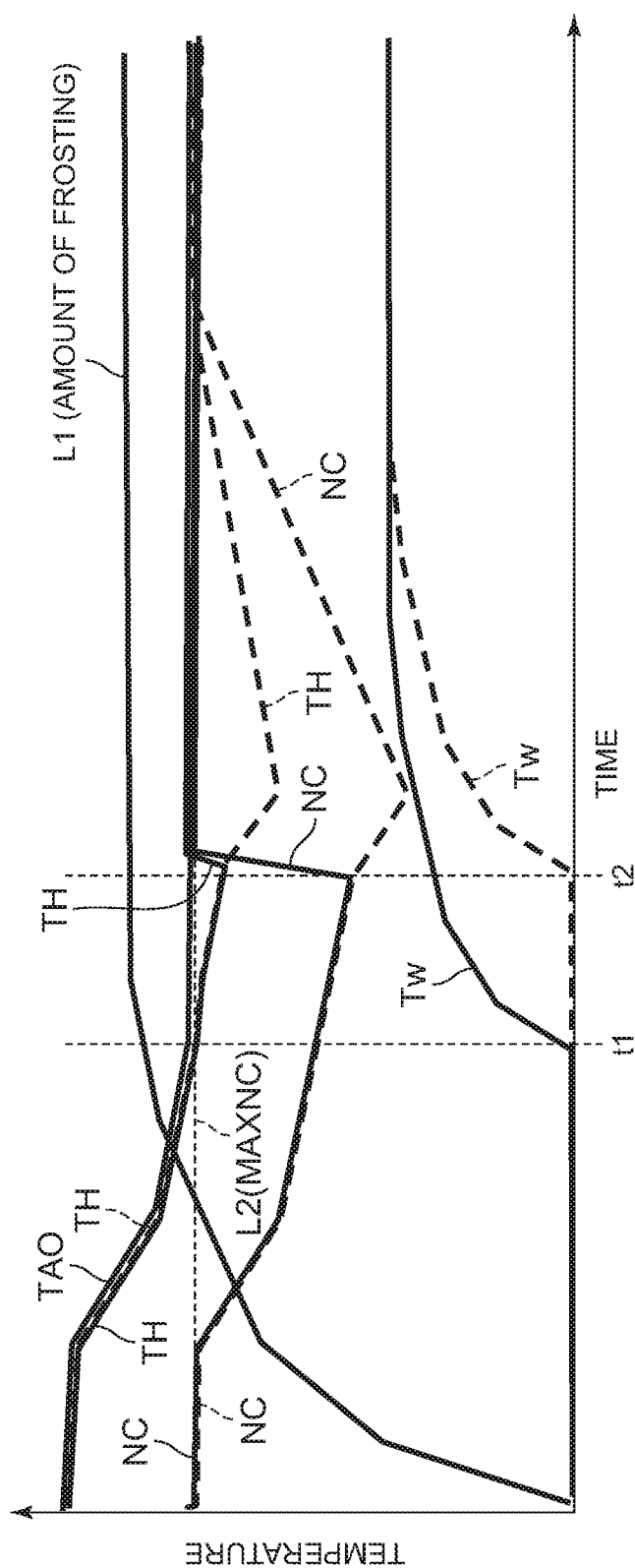
FIG. 12 is a diagram describing temperature changes of respective parts when changing from the heating operation to the second heat medium heat absorption/heating mode where there is a possibility that outdoor air heat absorption becomes impossible.
Figure 13:
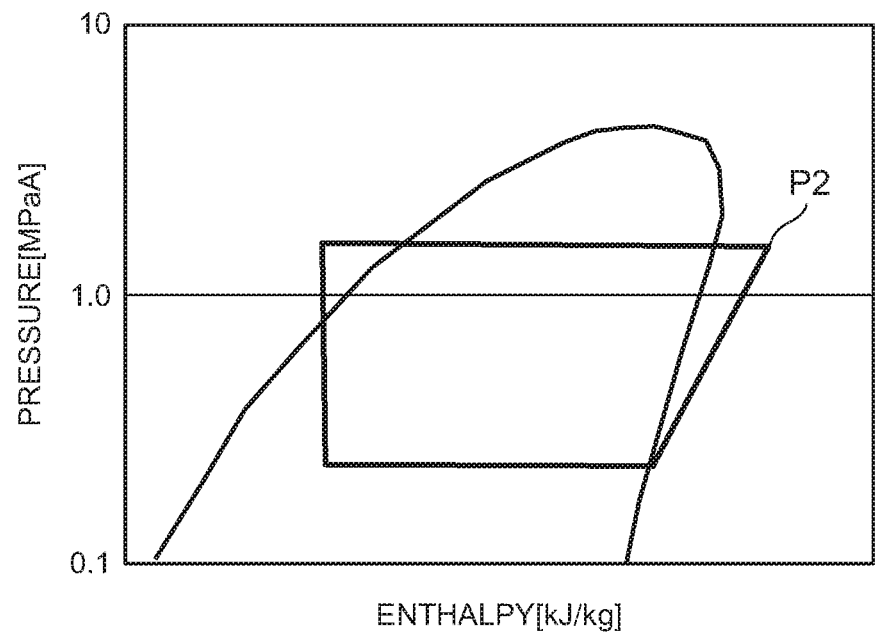
FIG. 13 is a p-h diagram of a refrigerant circuit where a heat medium preheating operation is executed.
Figure 14:
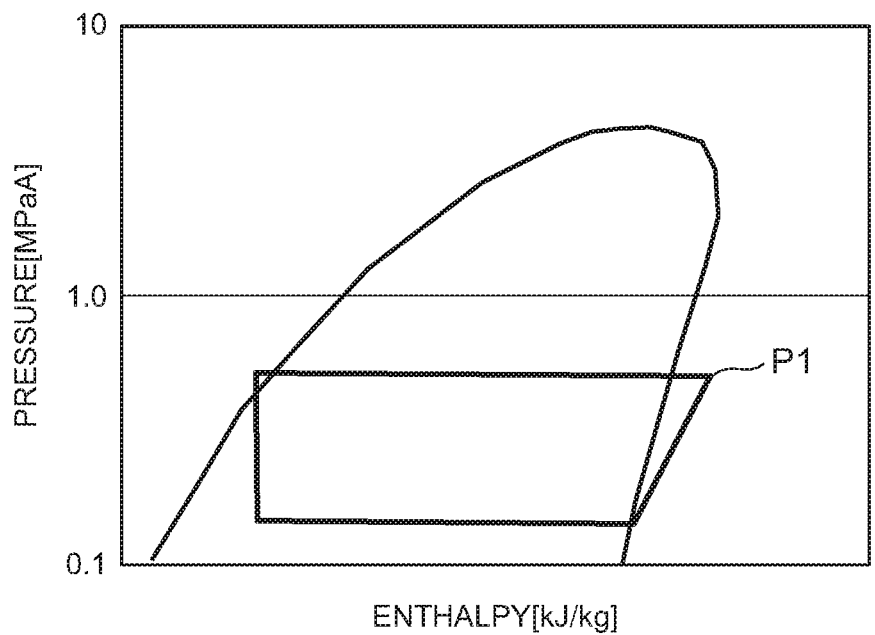
FIG. 14 is a p-h diagram of the refrigerant circuit where the heat medium preheating operation is not executed.

Here, FIG. 12 shows changes in the target outlet temperature TAO, the heating temperature TH, and the heat medium temperature Tw at the transition from the heating operation to the above-described second heat medium heat absorption/heating mode. Further, NC indicates the number of revolutions of the compressor 2, L1 indicates the amount of frosting to the outdoor heat exchanger 7, and L2 indicates the maximum value MAXNC of the number of revolutions NC of the compressor 2. Then, a time t1 in FIG. 12 indicates a time point where the heat medium preheating operation is started in Step S9 of FIG. 10, and t2 indicates a time point where the second heat medium heat absorption/heating mode is started in Step S8, respectively.

When the heat medium temperature Tw is in a low state (e.g., 0° C. or the like below the aforementioned threshold T1), and the heat medium preheating operation like Step S9 of the embodiment is not performed, the heat medium temperature Tw rises from the time t1 as indicated by a broken line in FIG. 12. Therefore, as indicated by P1 in a p-h diagram of FIG. 14, the discharge pressure of the compressor 2 becomes low, and the heating temperature TH is temporarily reduced as indicated by a broken line in FIG. 12 even if the second heat medium heat absorption/heating mode is started at a time t2 (the number of revolutions NC of the compressor 2 is also reduced). For that reason, a passenger feels discomfort.

On the other hand, when the heat medium preheating operation is executed in Step S9 before changing from the heating operation to the second heat medium heat absorption/heating mode as in the present invention, the heat medium temperature Tw rises from the time t1 and becomes higher than the threshold T1 at the time t2 (e.g., +20° C.) Therefore, as indicated by P2 in a p-h diagram of FIG. 13, the discharge pressure of the compressor 2 becomes high, and the heating temperature TH rises without being greatly reduced from the target outlet temperature TAO as indicated by a solid line in FIG. 12 by starting the second heat medium heat absorption/heating mode at the time t2 (the number of revolutions NC of the compressor 2 also rises).

In the present invention as described above in detail, there is provided the heat-generating equipment temperature adjusting device 61 for circulating the heat medium in the battery 55 (heat generating equipment mounted in the vehicle to adjust the temperature of the battery 55. The heat-generating equipment temperature adjusting device 61 has the heat medium heating heater 66 for heating the heat medium and the refrigerant-heat medium heat exchanger 64 for exchanging heat between the refrigerant and the heat medium. The controller 32 has the first and second heat medium heat absorption/heating modes to let the refrigerant discharged from the compressor 2 radiate heat in the radiator 4, decompress the refrigerant from which the heat has been radiated, and then let the refrigerant absorb heat in the refrigerant-heat medium heat exchanger 64. Therefore, if the changing to the first and second heat medium heat absorption/heating modes is done, the heat is absorbed from the heat medium of the heat-generating equipment temperature adjusting device 61 to make it possible to heat the vehicle interior efficiently. For example, even in the case where the cooling of the battery 55 is appropriately performed while suppressing the frosting to the outdoor heat exchanger 7, or the frost is formed in the outdoor heat exchanger 7 to make it unable to absorb heat from the outdoor air, the heat is absorbed from the heat medium of the heat-generating equipment temperature adjusting device 61 to thereby make it possible to heat the vehicle interior.

Particularly when the heat medium temperature Tw is the predetermined threshold T1 or less upon changing from the heating operation to the first and second heat medium heat absorption/heating modes, the controller 32 heats the heat medium by the heat medium heating heater 66 before changing to the first and second heat medium heat absorption/heating modes to raise the temperature of the heat medium and then performs changing to the first and second heat medium heat absorption/heating modes. Thus, it is possible to sufficiently ensure a heating capability when changing from the heating operation to the first and second heat medium heat absorbance/heating modes. Consequently, it is also possible to eliminate the disadvantage that the heating operation is changed to the first and second heat medium heat absorption/heating modes in the state in which the temperature of the heat medium is low, and the temperature (outlet temperature that coincides with the heating temperature TH) of the air blown out from the outlet 29 to the vehicle interior is temporarily lowered, so that the passenger feels discomfort and an uncomfortable feeling.

Further, in the embodiment, when the predetermined outdoor air heat-unabsorbable prediction and judgment condition is established in the heating operation, the controller 32 determines that there is a possibility that it will not be able to absorb heat from the outdoor air in the outdoor heat exchanger 7, and judges whether the temperature of the heat medium is the threshold T1 or less. If the temperature thereof is the threshold T1 or less, the controller starts to heat the heat medium by the heat medium heating heater 66 and makes a transition to the first and second heat medium heat absorption/heating modes in wait for raising of the temperature of the heat medium to at least a temperature (higher than the threshold T1 or a temperature higher than T1+$\alpha$1) higher than the threshold T1, thereby making it possible to smoothly perform changing from the heating operation to the first and second heat medium heat absorption/heating modes.

The outdoor air heat-unabsorbable prediction and judgment condition preferably includes at least one of as in the embodiment, reducing the suction refrigerant temperature Ts of the compressor 2 to the predetermined value Ts' or less, increasing the amount of frosting to the outdoor heat exchanger 7 to the predetermined value Fr1 or higher, raising the progress speed of frosting to the outdoor heat exchanger 7 to the predetermined value X1 or higher, reducing the outdoor air temperature Tam to the predetermined value Tam1 or less, and raising the reducing speed of the outdoor air temperature Tam to the predetermined value Y1 or higher.

Further, in the embodiment, the controller 32 determines the threshold T1 on the basis of at least one of the target heating capability TGQhp of the radiator 4, the target outlet temperature TAO being the target value of the temperature of the air blown out to the vehicle interior, the blower voltage BLV of the indoor blower 27 by which the air is to be passed through the air flow passage 3, and the target heater temperature TCO being the target value of the temperature (the heating temperature TH) of the air on the leeward side of the radiator 4. Therefore, the controller is capable of suitably determining whether it is necessary to heat the heat medium by the heat medium heating heater 66, and avoiding unnecessary heating by the heat medium heating heater 66.

Furthermore, in the embodiment, when the predetermined outdoor air heat-absorbable judgment condition is established, the controller 32 determines that the absorption of heat from the outdoor air is possible in the outdoor heat exchanger 7, and executes the first heat medium heat absorption/heating mode to let the refrigerant from which the heat has been radiated in the radiator 4 absorb heat in the outdoor heat exchanger 7 and the refrigerant-heat medium heat exchanger 64. Therefore, when the absorption of heat from the outdoor air is possible in the outdoor heat exchanger 7, it is possible to absorb heat even from the outdoor air together with the absorption of heat from the heat medium and thereby heat the vehicle interior.

The outdoor air heat-absorbable judgment condition is preferably at least one of as in the embodiment, the suction refrigerant temperature Ts of the compressor 2 being the predetermined value Ts2 or higher lower than the predetermined value Ts1, the amount of frosting to the outdoor heat exchanger 7 being the predetermined value Fr2 or less larger than the predetermined value Fr1, the progress speed of frosting to the outdoor heat exchanger 7 being the predetermined value X2 or less earlier than the predetermined value X1, the outdoor air temperature Tam being the predetermined value Tam2 or higher lower than the predetermined value Tam1, and the reducing speed of the outdoor air temperature Tam being the predetermined value Y2 or less earlier than the predetermined value Y1.

Incidentally, the constitutions of the refrigerant circuit R and the heat-generating equipment temperature adjusting device 61 described in each embodiment mentioned above are not limited thereto, and are needless to say changeable within the scope not departing from the gist of the present invention.

DESCRIPTION OF REFERENCE NUMERALS 1 vehicle air-conditioning device
2 compressor
3 air flow passage
4 radiator
6 outdoor expansion valve
7 outdoor heat exchanger
8 indoor expansion valve
9 heat absorber
17, 20, 21, 22 solenoid valve
27 indoor blower
28 air mix damper
32 controller (control device)
55 battery (heat generating equipment)
61 heat-generating equipment temperature adjusting device
62 circulating pump
64 refrigerant-heat medium heat exchanger
66 heat medium heating heater (heating device)
72 branch pipe (branch circuit)
73 auxiliary expansion valve
80 heat medium temperature sensor
R refrigerant circuit.

The invention claimed is:

1. A vehicle air-conditioning device comprising:
a compressor to compress a refrigerant;
an air flow passage through which air to be supplied to a vehicle interior flows;
a radiator to let the refrigerant radiate heat, thereby heating the air to be supplied from the air flow passage to the vehicle interior;
an outdoor heat exchanger disposed outside the vehicle interior to let the refrigerant absorb heat; and
a control device,
whereby the control device executes at least a heating operation to let the refrigerant discharged from the compressor radiate heat in the radiator, decompress the refrigerant from which the heat has been radiated, and then let the refrigerant absorb heat in the outdoor heat exchanger,
wherein the vehicle air-conditioning device includes a heat-generating equipment temperature adjusting device to circulate a heat medium in heat generating equipment mounted in a vehicle to adjust the temperature of the heat generating equipment,
wherein the heat-generating equipment temperature adjusting device has a heating device to heat the heat medium, and a refrigerant-heat medium heat exchanger to exchange heat between the refrigerant and the heat medium,
wherein the control device has a heat medium heat absorption/heating mode to let the refrigerant discharged from the compressor radiate heat in the radiator, decompress the refrigerant from which the heat has been radiated, and then let the refrigerant absorb heat in the refrigerant-heat medium heat exchanger, and
wherein when the temperature of the heat medium is a predetermined threshold T1 or less upon changing from the heating operation to the heat medium heat absorption/heating mode, the control device heats the heat medium by the heating device to raise the temperature of the heat medium before changing to the heat medium heat absorption/heating mode, and then performs changing to the heat medium heat absorption/heating mode.

2. The vehicle air-conditioning device according to claim 1, wherein when a predetermined outdoor air heat-unabsorbable prediction and judgment condition is established in the heating operation, the control device determines that there is a possibility that it will not be able to absorb heat from outdoor air in the outdoor heat exchanger and judges whether the temperature of the heat medium is the threshold T1 or less, and when the temperature thereof is the threshold T1 or less, the control device starts heating of the heat medium by the heating device and makes a transition to the heat medium heat absorption/heating mode in wait for raising of the temperature of the heat medium to at least a temperature higher than the threshold T1.

3. The vehicle air-conditioning device according to claim 2, wherein the outdoor air heat-unabsorbable prediction and judgment condition includes at least one of reducing a suction refrigerant temperature Ts of the compressor to a predetermined value Ts1 or less, increasing an amount of frosting to the outdoor heat exchanger to a predetermined value Fr1 or higher, raising a progress speed of frosting to the outdoor heat exchanger to a predetermined value X1 or higher, reducing an outdoor air temperature Tam to a predetermined value Tam1 or less, and raising a reducing speed of the outdoor air temperature Tam to a predetermined value Y1 or higher.

4. The vehicle air-conditioning device according claim 1, wherein the control device determines the threshold T1 on the basis of at least one of a target heating capability TGQhp of the radiator, a target outlet temperature TAO being a target value of a temperature of the air blown out to the vehicle interior, a voltage BLV of an indoor blower by which the air is to be passed through the air flow passage, and a target heater temperature TCO being a target value of a temperature of the air on a leeward side of the radiator.

5. The vehicle air-conditioning device according to claim 1, wherein when a predetermined outdoor air heat-absorbable judgment condition is established upon executing the heat medium heat absorption/heating mode, the control device determines that the absorption of heat from the outdoor air is possible in the outdoor heat exchanger, and lets the refrigerant from which the heat has been radiated in the radiator absorb heat in the outdoor heat exchanger and the refrigerant-heat medium heat exchanger.

6. The vehicle air-conditioning device according to claim 5, wherein the outdoor air heat-absorbable judgment condition includes at least one of the suction refrigerant temperature Ts of the compressor being a predetermined value Ts2 or higher lower than the predetermined value Ts1, the amount of frosting to the outdoor heat exchanger being a predetermined value Fr2 or less larger than the predetermined value Fr1, the progress speed of frosting to the outdoor heat exchanger being a predetermined value X2 or less earlier than the predetermined value X1, the outdoor air temperature Tam being a predetermined value Tam2 or higher lower than the predetermined value Tam1, and the reducing speed of the outdoor air temperature Tam being a predetermined value Y2 or less earlier than the predetermined value Y1.

7. The vehicle air-conditioning device according to claim 2, wherein the control device determines the threshold T1 on the basis of at least one of a target heating capability TGQhp of the radiator, a target outlet temperature TAO being a target value of a temperature of the air blown out to the vehicle interior, a voltage BLV of an indoor blower by which the air is to be passed through the air flow passage, and a target heater temperature TCO being a target value of a temperature of the air on a leeward side of the radiator.

8. The vehicle air-conditioning device according to claim 3, wherein the control device determines the threshold T1 on the basis of at least one of a target heating capability TGQhp of the radiator, a target outlet temperature TAO being a target value of a temperature of the air blown out to the vehicle interior, a voltage BLV of an indoor blower by which the air is to be passed through the air flow passage, and a target heater temperature TCO being a target value of a temperature of the air on a leeward side of the radiator.

9. The vehicle air-conditioning device according to claim 2, wherein when a predetermined outdoor air heat-absorbable judgment condition is established upon executing the heat medium heat absorption/heating mode, the control device determines that the absorption of heat from the outdoor air is possible in the outdoor heat exchanger, and lets the refrigerant from which the heat has been radiated in the radiator absorb heat in the outdoor heat exchanger and the refrigerant-heat medium heat exchanger.

10. The vehicle air-conditioning device according to claim 3, wherein when a predetermined outdoor air heat-absorbable judgment condition is established upon executing the heat medium heat absorption/heating mode, the control device determines that the absorption of heat from the outdoor air is possible in the outdoor heat exchanger, and lets the refrigerant from which the heat has been radiated in the radiator absorb heat in the outdoor heat exchanger and the refrigerant-heat medium heat exchanger.

11. The vehicle air-conditioning device according to claim 4, wherein when a predetermined outdoor air heat-absorbable judgment condition is established upon executing the heat medium heat absorption/heating mode, the control device determines that the absorption of heat from the outdoor air is possible in the outdoor heat exchanger, and lets the refrigerant from which the heat has been radiated in the radiator absorb heat in the outdoor heat exchanger and the refrigerant-heat medium heat exchanger.

* * * * *